US009811349B2

(12) United States Patent
Ooba

(10) Patent No.: US 9,811,349 B2
(45) Date of Patent: Nov. 7, 2017

(54) DISPLAYING OPERATIONS PERFORMED BY MULTIPLE USERS

(75) Inventor: Osamu Ooba, Tokyo (JP)

(73) Assignee: Sony Corporation, Tokyo (JP)

(*) Notice: Subject to any disclaimer, the term of this patent is extended or adjusted under 35 U.S.C. 154(b) by 765 days.

(21) Appl. No.: 12/885,632

(22) Filed: Sep. 20, 2010

(65) Prior Publication Data
US 2011/0078573 A1 Mar. 31, 2011

(30) Foreign Application Priority Data
Sep. 28, 2009 (JP) ................... 2009-222392

(51) Int. Cl.
G06F 3/0486 (2013.01)
G06F 9/44 (2006.01)
H04L 27/32 (2006.01)
G06F 3/01 (2006.01)
H04L 29/06 (2006.01)

(52) U.S. Cl.
CPC .............. *G06F 9/4443* (2013.01); *G06F 3/01* (2013.01); *G06F 3/0486* (2013.01); *G06F 2209/544* (2013.01); *G06F 2209/545* (2013.01); *H04L 27/32* (2013.01); *H04L 29/06421* (2013.01)

(58) Field of Classification Search
CPC .......... G06F 3/00; G06F 3/048; G06F 3/0486; H04L 29/06421; H04L 12/1822
USPC ................................ 715/755, 769
See application file for complete search history.

(56) References Cited

U.S. PATENT DOCUMENTS

| 5,107,443 | A | * | 4/1992 | Smith et al. ............... 715/751 |
| 5,758,110 | A | * | 5/1998 | Boss ................ G06F 3/0481 |
| | | | | 715/204 |
| 5,949,414 | A | * | 9/1999 | Namikata et al. ........... 715/753 |
| 6,191,807 | B1 | * | 2/2001 | Hamada et al. ........... 348/14.07 |
| 6,219,045 | B1 | * | 4/2001 | Leahy et al. ............. 715/757 |
| 6,559,863 | B1 | * | 5/2003 | Megiddo ................ 715/753 |
| 6,728,784 | B1 | * | 4/2004 | Mattaway ............... 709/245 |
| 6,772,195 | B1 | * | 8/2004 | Hatlelid et al. ............ 709/204 |
| 6,784,901 | B1 | * | 8/2004 | Harvey et al. ............ 715/757 |
| 6,910,186 | B2 | * | 6/2005 | Kim .................... 715/706 |
| 6,981,223 | B2 | * | 12/2005 | Becker et al. ............. 715/753 |

(Continued)

FOREIGN PATENT DOCUMENTS

JP 2006-031359 A 2/2006

*Primary Examiner* — Doon Chow
*Assistant Examiner* — Le Nguyen
(74) *Attorney, Agent, or Firm* — Wolf, Greenfield & Sacks, P.C.

(57) ABSTRACT

Provided is a terminal apparatus including a display unit displaying an execution screen of a shared application, reflecting on a display operations performed by multiple users as operations performed on one application, where the shared application includes a function for displaying an identification object that associates each of the users with an operation result, displayed on the execution screen, reflecting the operation performed by each of the users, a function for setting, when a first user selects an identification object related to a second user and specifies a region on the screen, the specified region as a shared region that is shared by the first and second users, and a function for controlling, when the first or second user performs operation in the shared region, such that the displayed operation result reflecting the operation is not shown to users other than the first and second users.

15 Claims, 21 Drawing Sheets

(56) References Cited

U.S. PATENT DOCUMENTS

| | | | | |
|---|---|---|---|---|
| 7,124,164 | B1* | 10/2006 | Chemtob | 709/204 |
| 7,197,126 | B2* | 3/2007 | Kanada | 379/202.01 |
| 7,478,129 | B1* | 1/2009 | Chemtob | H04L 12/1827 |
| | | | | 709/204 |
| 7,568,167 | B2* | 7/2009 | Van Dok et al. | 715/789 |
| 7,669,134 | B1* | 2/2010 | Christie et al. | 715/758 |
| 7,840,903 | B1* | 11/2010 | Amidon et al. | 715/757 |
| 7,895,209 | B2* | 2/2011 | Spence et al. | 707/740 |
| 7,958,453 | B1* | 6/2011 | Taing | 715/744 |
| 8,146,002 | B2* | 3/2012 | Price | G06F 3/038 |
| | | | | 715/755 |
| 8,627,213 | B1* | 1/2014 | Jouppi et al. | 715/758 |
| 2001/0002831 | A1* | 6/2001 | Kato et al. | 345/326 |
| 2003/0001890 | A1* | 1/2003 | Brin | 345/753 |
| 2006/0010392 | A1* | 1/2006 | Noel | G06F 3/0481 |
| | | | | 715/759 |
| 2006/0053380 | A1* | 3/2006 | Spataro et al. | 715/753 |
| 2006/0080432 | A1* | 4/2006 | Spataro et al. | 709/224 |
| 2006/0146765 | A1* | 7/2006 | Van De Sluis et al. | 370/338 |
| 2007/0064682 | A1* | 3/2007 | Adams et al. | 370/352 |
| 2007/0150924 | A1* | 6/2007 | Ichinose et al. | 725/78 |
| 2007/0174787 | A1* | 7/2007 | Rhee | 715/810 |
| 2007/0294632 | A1* | 12/2007 | Toyama | G06F 3/038 |
| | | | | 715/764 |
| 2008/0065580 | A1* | 3/2008 | Spence et al. | 706/62 |
| 2009/0089683 | A1* | 4/2009 | Thapa | 715/756 |
| 2009/0138809 | A1* | 5/2009 | Arad | 715/758 |
| 2009/0172565 | A1* | 7/2009 | Jackson et al. | 715/753 |
| 2009/0292999 | A1* | 11/2009 | LaBine | H04L 12/1827 |
| | | | | 715/740 |
| 2010/0009719 | A1* | 1/2010 | Oh et al. | 455/563 |
| 2010/0030578 | A1* | 2/2010 | Siddique et al. | 705/3 |
| 2010/0037151 | A1* | 2/2010 | Ackerman | G06Q 10/10 |
| | | | | 715/753 |
| 2010/0058214 | A1* | 3/2010 | Singh et al. | 715/769 |
| 2010/0070899 | A1* | 3/2010 | Hunt | G06F 17/30861 |
| | | | | 715/769 |
| 2010/0122184 | A1* | 5/2010 | Vonog et al. | 715/753 |
| 2010/0124906 | A1* | 5/2010 | Hautala | 455/412.1 |
| 2010/0131868 | A1* | 5/2010 | Chawla | G06F 3/044 |
| | | | | 715/759 |
| 2010/0162138 | A1* | 6/2010 | Pascal et al. | 715/758 |
| 2010/0169814 | A1* | 7/2010 | Zhang | G06F 1/1626 |
| | | | | 715/769 |
| 2011/0055729 | A1* | 3/2011 | Mason et al. | 715/753 |
| 2011/0066928 | A1* | 3/2011 | Karlsson | 715/202 |
| 2011/0179126 | A1* | 7/2011 | Wetherell | H04L 51/36 |
| | | | | 709/206 |
| 2012/0166980 | A1* | 6/2012 | Yosef et al. | 715/762 |
| 2013/0055113 | A1* | 2/2013 | Chazin | H04L 12/1822 |
| | | | | 715/758 |

* cited by examiner

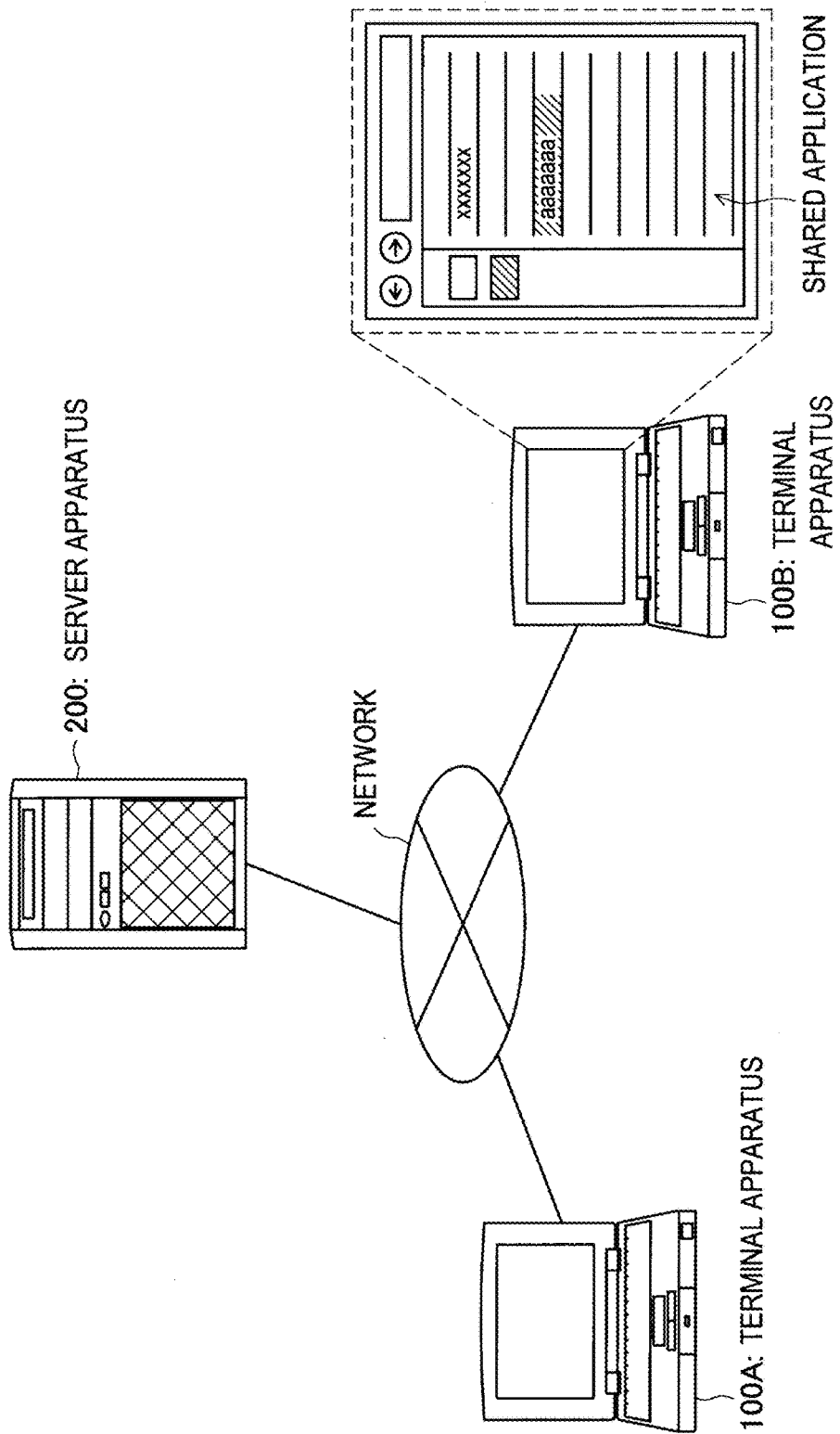

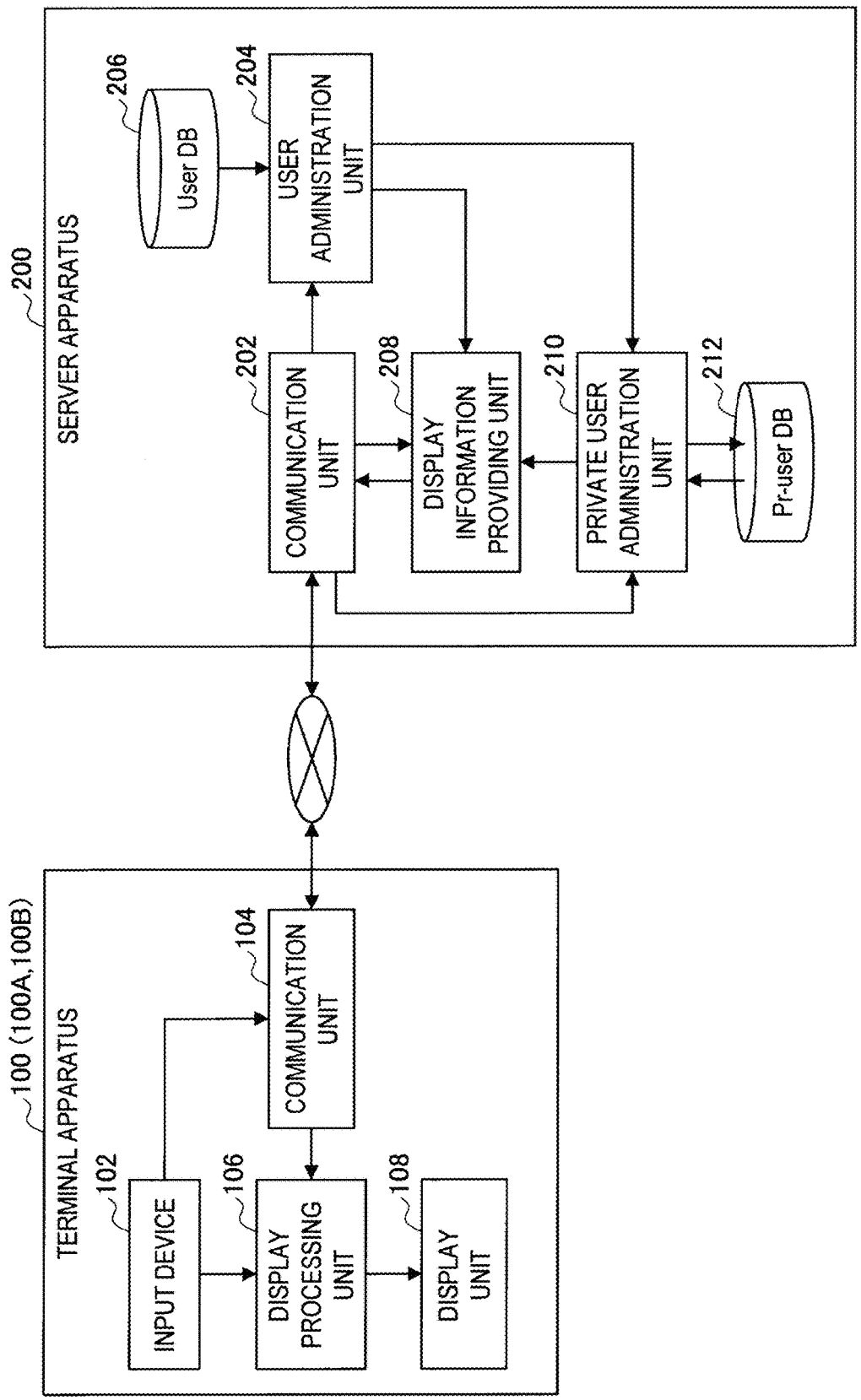

FIG.3A

FIG.3B (S152: User A MAKES PRIVATE SHARING REQUEST)

(S154: UserS B AND D ACCEPT PRIVATE SHARING REQUEST)

(S156: DISPLAY PRIVATE SHARED REGION OF UserS A, B AND D)

DISPLAYING OPERATIONS PERFORMED BY MULTIPLE USERS

CROSS REFERENCE TO RELATED APPLICATIONS

The present application claims priority under 35 U.S.C. §119 to Japanese Patent Application JP 2009-222392, filed in the Japan Patent Office on Sep. 28, 2009, which is incorporated by reference herein in its entirety.

BACKGROUND OF THE INVENTION

Field of the Invention

The present invention relates to a terminal apparatus, a server apparatus, a display control method, and a program.

Description of the Related Art

With rapid advancement in information processing technology and communication technology, multiple users can share an application executed by a server apparatus on a network, and the multiple users can simultaneously perform operation with the same application in cooperation with each other. Examples of applications that can be shared by multiple users include text editor applications, drawing editor applications, and image sharing applications. In addition, there are network game applications and chat applications, which are similar to the above applications. The above applications are the same in that multiple users can perform operation with the same application by using multiple terminal apparatuses connected via a network. Japanese Patent Application Laid-Open No. 2006-31359 discloses a technique for realizing a virtual whiteboard onto which multiple users can draw figures and write characters.

SUMMARY OF THE INVENTION

However, when multiple users use the same application, it is necessary to have means for identifying who an operation result displayed on the application belongs to. For example, Japanese Patent Application Laid-Open No. 2006-31359 discloses a method for displaying operation results per user in different colors, which are displayed in the application. Further, Japanese Patent Application Laid-Open No. 2006-31359 discloses a method for displaying the users' operation tools in different shapes in the application. However, these methods are based on the premise that the respective users know correspondence relationship between the respective users and the colors and the correspondence relationship between the respective users and the operation tools. Further, the virtual whiteboard described in Japanese Patent Application Laid-Open No. 2006-31359 displays the operation results of all the users. Therefore, it is difficult to select users, to whom operation results are disclosed, according to the contents of the operation results. In a case where the technique disclosed in Japanese Patent Application Laid-Open No. 2006-31359 is applied, it is necessary to reset users who participate in operation on the virtual whiteboard in order to restrict the disclosure of the operation results as mentioned above.

In light of the foregoing, it is desirable to provide a novel and improved terminal apparatus, server apparatus, display control method, and program, which make it possible to recognize easily who an operation result displayed in an application shared by a plurality of users belongs to, and to restrict disclosure-member of operation results with easy operation.

According to an embodiment of the present invention, there is provided a terminal apparatus including a shared application display unit for displaying on a screen an execution screen of a shared application, reflecting on a display operations performed by a plurality of users via a plurality of terminal apparatuses connected to a network as operations performed on one application, where the shared application includes an identification object display function for displaying an identification object that associates each of the users with an operation result, displayed on the execution screen, reflecting the operation performed by each of the users, a shared region setting function for setting, when a first user selects an identification object related to a second user and specifies a region on the screen, the specified region as a shared region that is shared by the first and second users, and a display control function for controlling, when the first or second user performs operation in the shared region set by the shared region setting function, such that the displayed operation result reflecting the operation is not shown to users other than the first and second users.

When the first user selects the identification object related to the second user and specifies a first region on the screen, and the first user selects an identification object related to a third user and specifies a second region on the screen, and the shared region setting function sets a first shared region that is shared by the first and second users and a second shared region that is shared by the first and third users, and the first user enlarges or moves the first shared region so that the first and second shared regions overlap with each other, the shared region setting function may set the overlapping portion of the first and second shared regions as a shared region that is shared by the first user, the second user, and the third user.

The identification object display function may display a line connecting between the operation result and the identification object and may visualize by the line correspondence relationship between the operation result and each of the users.

The shared application may be an application for sharing content. When the content is put in a shared state by the second user, the display control function may display a display object representing the content in the shared state at a display position of the identification object related to the second user, and may move the display object from the display position as a starting point.

When a size of the shared region is smaller than a size of the display object representing the content in the shared state, the display control function may periodically move or deform the identification object related to the second user, or may periodically change a color of the identification object.

The identification object may be displayed in a predetermined region located on the screen in a direction that is set for each of the users.

The terminal apparatus may further include a shared application execution unit for executing the shared application. The shared application display unit may display an execution result by the shared application execution unit on the screen.

According to another embodiment of the present invention, there is provided a server apparatus including an information providing unit for providing information for displaying an execution screen of a shared application to a plurality of terminal apparatuses, the shared application reflecting on a display operations performed by a plurality of users via the plurality of terminal apparatuses connected to a network as operations performed on one application, where the shared application includes an identification object display function for displaying an identification object that associates each of the users with an operation result, displayed on the execution screen, reflecting the operation performed by each of the users, a shared region setting function for setting, when a first user selects an identification object related to a second user and specifies a region on the screen, the specified region as a shared region that is shared by the first and second users, and a display control function for controlling, when the first or second user performs operation in the shared region set by the shared region setting function, such that the displayed operation result reflecting the operation is not shown to users other than the first and second users.

According to another embodiment of the present invention, there is provided a display control method by setting sharing, including the steps of setting, in a state where an execution screen of a shared application is displayed on a screen, the shared application reflecting on a display operations performed by a plurality of users via a plurality of terminal apparatuses connected to a network as operations performed on one application, and an identification object is displayed that associates each of the users with an operation result, displayed on the execution screen, reflecting the operations performed by each of the users, and when a first user selects an identification object related to a second user and specifies a region on the screen, the specified region as a shared region that is shared by the first and second users; and controlling, when the first or second user performs operation in the shared region set at the shared region setting step, such that the displayed operation result reflecting the operation is not shown to users other than the first and second users.

According to another embodiment of the present invention, there is provided a program for causing a computer to realize a function for reflecting on a display operations performed by a plurality of users via a plurality of terminal apparatuses connected to a network as operations performed on one application, an identification object display function for displaying an identification object that associates each of the users with an operation result, displayed on the execution screen, reflecting the operation performed by each of the users, a shared region setting function for setting, when a first user selects an identification object related to a second user and specifies a region on the screen, the specified region as a shared region that is shared by the first and second users, and a display control function for controlling, when the first or second user performs operation in the shared region set by the shared region setting function, such that the displayed operation result reflecting the operation is not shown to users other than the first and second users.

According to another embodiment of the present invention, there is provided a computer-readable recoding medium having the program recorded thereon.

As described above, according to the present invention, it becomes possible to recognize easily who an operation result displayed in an application shared by a plurality of users belongs to, and to restrict disclosure-member of operation results with easy operation.

BRIEF DESCRIPTION OF THE DRAWINGS

FIG. 1 is an explanatory diagram showing an example of a system configuration of an information processing apparatus according to an embodiment of the present invention;

FIG. 2 is an explanatory diagram showing an example of a functional configuration of a terminal apparatus and a server apparatus according to the embodiment;

FIG. 3A is an explanatory diagram showing an example of a display structure of a shared application according to the embodiment;

FIG. 3B is an explanatory diagram showing an example of the display structure of the shared application according to the embodiment;

DETAILED DESCRIPTION OF THE EMBODIMENT(S)

Figure 4:
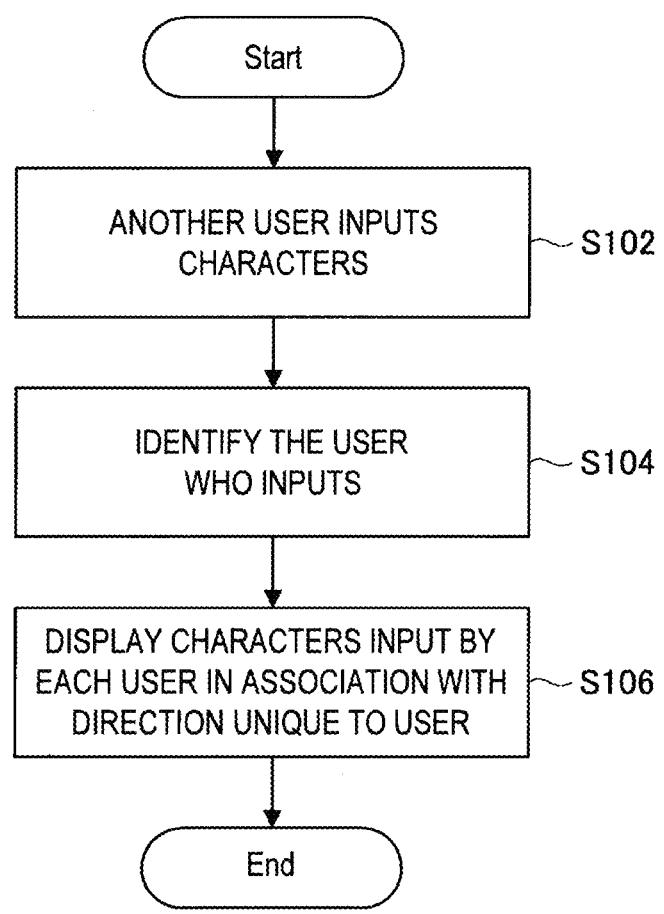
FIG. 4 is an explanatory diagram showing processing flow according to a display method of the embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Explanation]

Now, the flow of explanation about an embodiment of the present invention described below will be briefly mentioned.

First, a system configuration of an information processing system 10 according to the present embodiment will be described with reference to FIG. 1. Subsequently, a terminal apparatus 100 and a server apparatus 200 in the information processing system 10 will be described in terms of functional configuration with reference to FIG. 2.

Figures 3A, 3B:
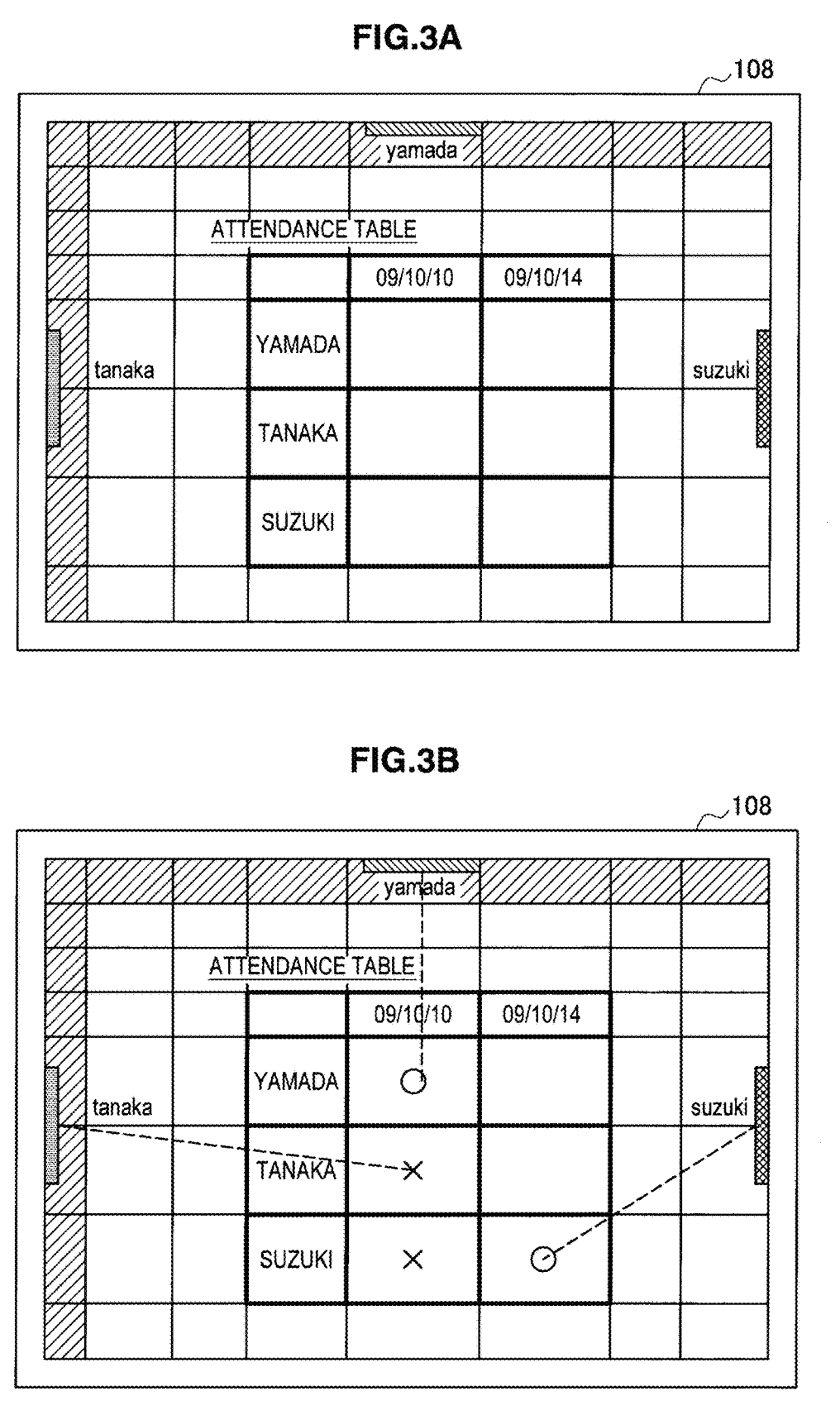

Subsequently, a display structure of a shared application according to the present embodiment and a correspondence between users and directions will be described with reference to FIG. 3A and FIG. 3B. In this explanation, an application example of a display method according to the present embodiment to a spreadsheet application will be described. In addition, a flow of processing for realizing display structures shown in FIG. 3A and FIG. 3B will be described with reference to FIG. 4. Subsequently, application of the display method according to the present embodiment to an image sharing application will be described with reference to FIG. 5, FIG. 6A, FIG. 6B, and FIG. 7.

Subsequently, a restriction method (for two parties) of a sharing region according to the present embodiment will be described with reference to FIG. 8, FIG. 9, FIG. 10A, and FIG. 10B. In this explanation, a method for restricting sharing of content to two parties will be exemplified. Subsequently, a restriction method (for multiple parties) of a sharing region according to the present embodiment will be described with reference to FIG. 11, FIG. 12A, FIG. 12B, FIG. 12C, and FIG. 12D. In this explanation, a method for restricting sharing of content to some of three or more users will be described as an example.

Subsequently, operation for moving content to a shared region (all parties, two parties, multiple parties) will be described with reference to FIG. 15, FIG. 16, and FIG. 17. Further, operation for moving content between shared regions will be described with reference to FIG. 18. Subsequently, operation for moving an identification object that is displayed to associate a user with a direction will be described with reference to FIG. 19A, FIG. 19B, FIG. 19C.

Subsequently, an example of hardware configuration of an information processing apparatus that is capable of realizing the functions of the terminal apparatus and the server apparatus according to the present embodiment will be described with reference to FIG. 20. At the last, technical concepts of the embodiment will be summarized, and advantageous effects obtained from the technical concepts will be briefly described.

(Explanation Items)

1: Embodiment
    1-1: System Configuration
    1-2: Functional Configuration
    1-3: Correspondence Between Users and Directions
        1-3-1: Example of display structure (Application Example to Spreadsheet Application)
        1-3-2: Processing Flow
        1-3-3: Example of display structure (Application Example to Image Sharing Application)
    1-4: Regarding Private Sharing
        1-4-1: Method for Setting Private Sharing by Two Parties
        1-4-2: Method for Setting Private Sharing by Multiple Parties
        1-4-3: Moving Content to Shared Region
    1-5: Operation of Identification Object
    1-6: Hardware Configuration
2: Conclusion

1: EMBODIMENT

An embodiment of the present invention will be described. The present embodiment relates to a display method which allows users participating in operation of the shared application and operation results of the respective users displayed in a shared application to be easily identified. The present embodiment also relates to a method for restricting display of operation results to a specific user in the shared application. In particular, in the present embodiment, a configuration of a user interface is suggested which makes it possible to manage, with easy operation, content sharing permission given to a limited number of users in a sharing application for sharing content such as images and music.

[1-1: System Configuration]

First, the system configuration of the information processing system 10 according to the present embodiment will be described with reference to FIG. 1. FIG. 1 is an explanatory diagram illustrating the system configuration of the information processing system 10 according to the present embodiment.

As shown in FIG. 1, the information processing system 10 mainly includes terminal apparatuses 100A, 100B and a server apparatus 200. The terminal apparatuses 100A, 100B have substantially the same functional configuration with respect to the technical features of the present embodiment. Accordingly, in the below explanation, the terminal apparatuses 100A, 100B may be simply referred to as terminal apparatus 100. In FIG. 1, two terminal apparatuses 100A, 100B are described as examples. Alternatively, the information processing system 10 may include three or more terminal apparatuses 100.

As shown in FIG. 1, the terminal apparatuses 100A, 100B are connected to the server apparatus 200 via a network. However, this network may be a wide area network such as the Internet, or may be a local network such as LAN (Local Area Network). The terminal apparatuses 100A, 100B are information processing terminals capable of displaying execution screens of a shared application.

Examples of shared applications include text editor applications, spreadsheet applications, content sharing applications (for example, a sharing application for sharing images, music, texts, and other data). Any one of the terminal apparatuses 100A, 100B and the server apparatus 200 can execute the above shared applications.

For example, in the case of a Web-based sharing application, the server apparatus 200 executes the shared application, and transmits only execution screens and operation results thereof to the terminal apparatuses 100A, 100B. The execution screens and the operation results transmitted from the server apparatus 200 are displayed on Web browsers of the terminal apparatuses 100A, 100B. The contents of operations input by each user with the terminal apparatuses 100A, 100B are transmitted to the server apparatus 200, and the contents of operations are reflected as the operation results in the execution screen of the shared application. It should be noted that even in the case of the Web-based sharing application, some of the processes of operation performed by the shared application are executed by the terminal apparatuses 100A, 100B.

Alternatively, the operations performed with the shared application may be shared by executing the shared application on the respective terminal apparatuses 100A, 100B, and exchanging the contents of the operations performed by the respective users on the terminal apparatuses 100A, 100B with each other. With this method, the application can be shared by only the terminal apparatuses 100A, 100B without the server apparatus 200. For example, when a user operates the terminal apparatus 100A, the content of the operation is transmitted to the terminal apparatus 100B. Thereupon, the terminal apparatus 100B generates an execution result of the shared application related to the content of the operation, and the generated operation result is displayed on a screen. Thus, the application can be shared without the server apparatus 200 by causing the terminal apparatus 100A, 100B to execute the above processing with each other.

In the below explanation, the functions of the shared application achieved with the server apparatus 200 will be described for the sake of convenience of explanation. When the shared application is used, it is necessary to have means for identifying which user the operation result displayed in the shared application belongs to. For example, as shown in FIG. 1, a method for displaying operation results, displayed on the shared application, per user in different colors may be considered. However, even when the operation results are displayed per user in different colors, each user needs to remember which user is related to which color. Thus, it is very cumbersome for the users as the number of users increases.

To solve the above issues, auxiliary information including correspondences between colors and user names may be displayed on an execution screen of a shared application in order to show the correspondences between the users and the colors on the screen. However, when the auxiliary information is displayed, the work region allocated on the execution screen of the shared application is reduced. In addition, the operational efficiency is reduced, if a user references the auxiliary information on every occasion. Due to the above reasons, even if the auxiliary information is displayed, a method is desired which allows the users to more reliably recognize the respective users and the operation results of the respective users with the minimum auxiliary information. For this issue, the inventors of the present application have devised a display method for easily identifying operation results and respective users by associating the respective users with "directions".

The display method according to the present embodiment will be hereinafter described in detail.

[1-2: Functional Configuration]

First, the functional configuration of the terminal apparatus 100 and the server apparatus 200 that is capable of realizing the display method according to the present embodiment will be described with reference to FIG. 2. FIG. 2 is an explanatory diagram illustrating an example of functional configuration of the terminal apparatus 100 and the server apparatus 200 according to the present embodiment.

(Terminal Apparatus 100)

First, the functional configuration of the terminal apparatus 100 will be described.

As shown in FIG. 2, the terminal apparatus 100 mainly includes an input device 102, a communication unit 104, a display processing unit 106, and a display unit 108. Examples of the input device 102 include a keyboard, a mouse, a trackball, a ten keypad, a touch panel, a touch pad, a jog dial, and various kinds of buttons. However, in the below explanation, the input device 102 is assumed to be a touch panel. The display unit 108 is a display device such as LCD, OELD, and PDP, for example.

When a user operates the input device 102, a signal indicating operation contents (hereinafter referred to as operation signal) is given to the communication unit 104 and the display processing unit 106. For example, when a user performs operation on a shared application, the operation signal input from the input device 102 to the communication unit 104 is transmitted by the communication unit 104 to the server apparatus 200 via a network. At this occasion, not only the operation signal but also information for identifying the user of the terminal apparatus 100 (hereinafter referred to as user information) are transmitted to the server apparatus 200. The user information may be a user ID by which individual users can be identified in the shared application, or may be address information or device information (for example, an IP address or a MAC address) by which individual terminal apparatus 100 can be identified.

When the operation signal is input from the input device 102 to the display processing unit 106, the display processing unit 106 controls operation of the shared application according to the operation signal. For example, in a case where a user inputs characters on a shared application for editing characters, the display processing unit 106 causes the display unit 108 to display characters on the execution screen of the shared application according to the operation signal indicating the character input operation. In the case of a Web-based shared application, the display processing unit 106 starts a Web browser and causes the display unit 108 to display a start screen. Further, the display processing unit 106 displays the execution screen of the shared application on the Web browser.

When operation is performed on the shared application by another terminal apparatus 100, operation signal of another user to the terminal apparatus 100 is transmitted via the server apparatus 200, and the operation signal is received by the communication unit 104. At this occasion, the communication unit 104 receives not only the operation signal but also user information of such other user related to the operation signal. Then, the operation signal and the user information of such other user received by the communication unit 104 are given to the display processing unit 106. When the operation signal and the user information of such other user are given to the display processing unit 106, the display processing unit 106 displays operation results on the execution screen of the shared application according to the operation signal of such other user. Further, the display processing unit 106 displays an identification object of such other user identified by the received user information.

Then, correspondence between the identification object and the operation results of such other user is clearly shown by the display processing unit 106 on the execution screen of the shared application. The configuration of the identification object and the method for displaying the correspondence will be described later in detail using specific examples. As described above, the operation contents of a self-user and another user are reflected in the shared application displayed on the display unit 108.

(Server Apparatus 200)

Subsequently, the functional configuration of the server apparatus 200 will be described.

As shown in FIG. 2, the server apparatus 200 mainly includes a communication unit 202, a user administration unit 204, a user database 206, a display information providing unit 208, a private user administration unit 210, and a private user database 212.

When a user performs operation on a shared application, an operation signal is transmitted from the terminal apparatus 100 to the server apparatus 200. The operation signal transmitted from the terminal apparatus 100 is received by the communication unit 202. At this occasion, the communication unit 202 receives not only the operation signal but also the user information of the terminal apparatus 100. The user information received by the communication unit 202 is given to the user administration unit 204. Further, the operation signal received by the communication unit 202 is given to the display information providing unit 208 and the private user administration unit 204.

When the user administration unit 204 receives the user information, the user administration unit 204 identifies the user based on the received user information. At this occasion, the user administration unit 204 references the user database 206, and determines whether the received user information is the user information of the registered user who can use the shared application. When the received user information is determined not to be the user information of the registered user, the user administration unit 204 transmits error information to a sender of the user information via the communication unit 202. On the other hand, when the user information is determined to be the user information of the registered user, the user administration unit 204 transmits the user ID corresponding to the received user information to the display information providing unit 208 and the private user administration unit 210.

As described above, the display information providing unit 208 receives the operation signal and the user ID. When the display information providing unit 208 receives the operation signal and the user ID, the display information providing unit 208 inputs information indicating a display method of an identification object related to the received user ID (hereinafter referred to as display information), the operation signal, and the user ID to the communication unit 202. When the communication unit 202 receives the display information, the operation signal, and the user ID, the communication unit 202 transmits the display information, the operation signal, and the user ID, which have been received, to a terminal apparatus 100 of another user that is different from the sender of the operation signal. Besides, the method for displaying the identification object indicated by the display information will be described later in detail using specific examples.

The information processing system 10 according to the present embodiment has a function of restricting display of operation results to only a limited number of users (hereinafter referred to as private sharing user), instead of allowing the operation results to be shared by all the users who can use the shared application. This function is realized by the private user administration unit 210. As described above, the private user administration unit 210 receives an operation signal from the communication unit 202. When the private user administration unit 210 receives the operation signal, the private user administration unit 210 determines whether the contents of the received operation signal are directed to the private sharing users.

When the operation is determined not to be directed to the private sharing users, the private user administration unit 210 notifies the display information providing unit 208 that the operation is not directed to the private sharing users. On the other hand, when the operation is determined to be directed to the private sharing users, the private user administration unit 210 references the private user database 212, and identifies a group of the private sharing users to which the user having the user ID input from the user administration unit 204 belongs. The private user database 212 stores set groups of private sharing users and users IDs of users who belong to the group, in such a manner that the group and the corresponding user ID are associated with each other. Accordingly, the private user administration unit 210 reads all the user IDs (hereinafter referred to as the private sharing user IDs) belonging to the identified group, and inputs the obtained private sharing user IDs to the display information providing unit 208.

When the display information providing unit 208 receives the private sharing user IDs, the display information providing unit 208 inputs not only the display information, the operation signals, and the user IDs but also the private sharing user IDs to the communication unit 202, thus limiting the destination to the terminal apparatus 100 of the user related to the private sharing user ID. With such a configuration, when a user wants to disclose operation results made in the shared application to only a limited number of users, it is possible to restrict the users to which the operation results are disclosed. A method for setting private sharing users and a method for disclosing operation results to the private sharing users will be described later in detail using specific examples.

The functional configuration of the terminal apparatus 100 and the server apparatus 200 included in the information processing system 10 according to the present embodiment has been described above. In the above explanation, a function of each constituent element which operates when a user operation is performed on a shared application has been mainly described. In the below explanation, operation of shared application displayed on the display unit 108 of the terminal apparatus 100 and a method for displaying an identification object will be described in detail. Further, a method for setting private sharing users will be described in detail. These methods are realized by the display processing unit 106 arranged on the terminal apparatus 100, and by the display information providing unit 208 and the private user administration unit 210 arranged on the server apparatus 200.

[1-3: Correspondence Between Users and Directions]

A method for displaying an identification object, which associates results of operations made in the shared application with respective users, i.e., operators, will be hereinafter described with reference to FIG. 3A to FIG. 7. The display method described here is characterized by associating users with "directions".

(1-3-1: Example of Display Structure (Application Example to Spreadsheet Application))

First, FIG. 3A and FIG. 3B are referenced. FIG. 3A and FIG. 3B show an example of operation of a spreadsheet application shared by multiple users (self-user, Yamada, Tanaka, Suzuki). Herein, the self-user means the user using the terminal apparatus 100 whose display unit 108 displays the execution screens of the shared application as shown in FIG. 3A and FIG. 3B.

In the example shown in FIG. 3A, as identification objects, bars representing the respective users are shown on the upper side (Yamada), the left side (Tanaka), the right side (Suzuki) of the shared application. The user names of the respective users are displayed in proximity to the respective bars. Further, a user-specific color (in these figures, different hatching patterns) is added to each bar. As described above, in the shared application according to the present embodiment, the respective users are associated with the "directions", i.e., up, left, and right. When operations are performed by the respective users in a state where such identification objects are displayed, correspondence relationships between the identification objects and the operation results are clearly indicated as shown in FIG. 3B.

In the example of FIG. 3B, the users has filled in the table with "O" and "x". When these operations are performed, the operation results and the identification objects are connected by lines, so that the correspondence relationships between the operation results and the identification objects are clearly shown. As described above, the identification objects are associated with the directions specific to the respective users. Accordingly, the operator can be easily identified by recognizing the direction in which the line extends from the operation result. Alternatively, the line may be set in such a manner that the line becomes invisible as soon as the operation is completed. Further, operation results and corresponding identification objects may be displayed in a same color.

An example of method for displaying the identification objects according to the present embodiment has been described above. The above line is also an example of an identification object.

(1-3-2: Processing Flow)

Next, a processing flow for realizing display structures exemplified in FIG. 3A and FIG. 3B will be described with reference to FIG. 4. FIG. 4 is an explanatory diagram illustrating the processing flow for realizing the display structures exemplified in FIG. 3A and FIG. 3B.

First, characters are input by another user (step S102). For example, characters are input on the terminal apparatus 100 of such other user, and an operation signal indicating the character input is transmitted to the terminal apparatus 100 of the self-user via the server apparatus 200. Further, the user ID of such other user, i.e., operator, is transmitted from the server apparatus 200 to the terminal apparatus 100 of the self-user. Subsequently, the user who performs input operation is identified (step S104). For example, the user who performs input operation is identified based on the user ID transmitted from the server apparatus 200 to the terminal apparatus 100 of the self-user. Subsequently, the terminal apparatus 100 displays character input by each user (operation results) by associating the character input by each user with a direction specific to each user (step S106). At this occasion, the terminal apparatus 100 causes the display unit 108 to display not only identification objects but also lines connecting between the identification objects and the operation results.

The processing flow of the method for displaying identification objects according to the present embodiment has been described above. The processing body of each of the above steps may be changed as necessary.

(1-3-3: Example of Display Structure (Application Example to Image Sharing Application))

Subsequently, an example of image sharing application to which the method for displaying the identification objects according to the present embodiment is applied will be described with reference to FIG. 5, FIG. 6A, FIG. 6B, and FIG. 7.

Figure 5:
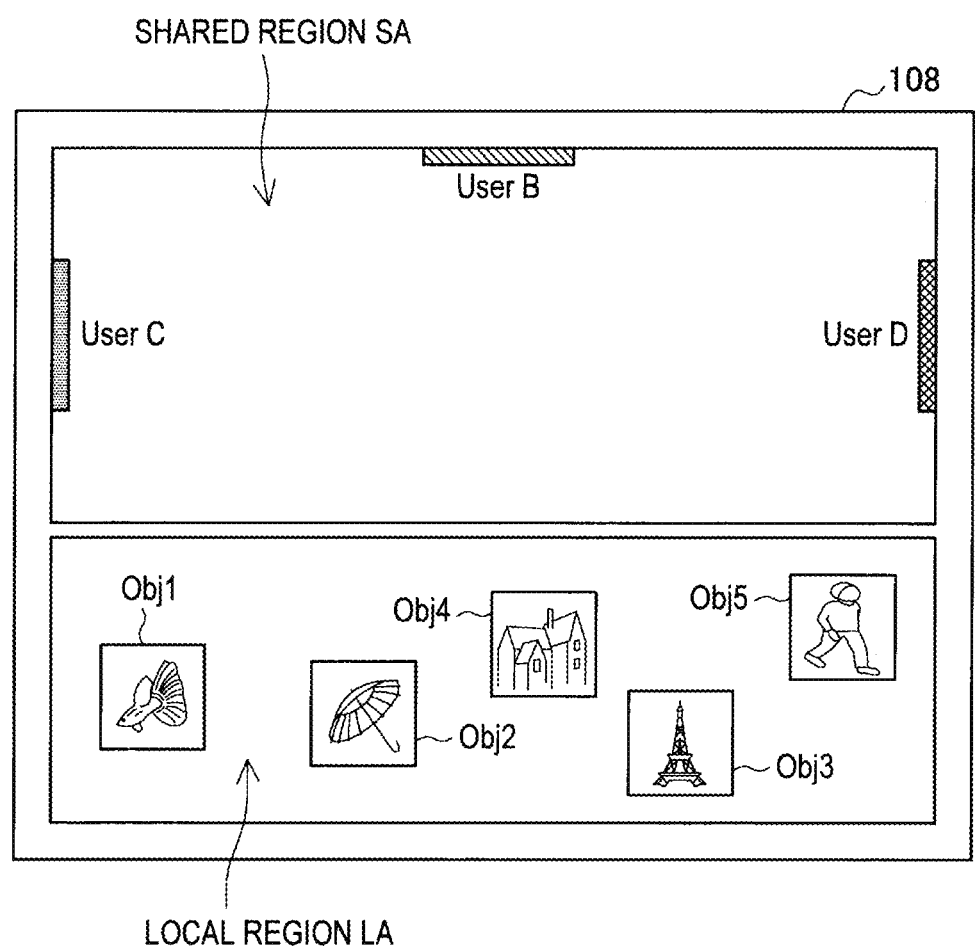
FIG. 5 is an explanatory diagram showing an example of the display structure of the shared application according to the embodiment.

First, FIG. 5 is referenced. FIG. 5 illustrates an example of display structure of an image sharing application. The execution screen of this image sharing application is divided into a shared region SA and a local region LA. The shared region SA is a region where image data are provided for sharing. On the other hand, non-shared image data are displayed in the local region LA. For example, when a display object of image data (for example, a reduced image or a thumbnail) in the local region LA is moved to the shared region SA, the image data related to the moved display object is shared by the users who share the image sharing application.

Figure 6A:
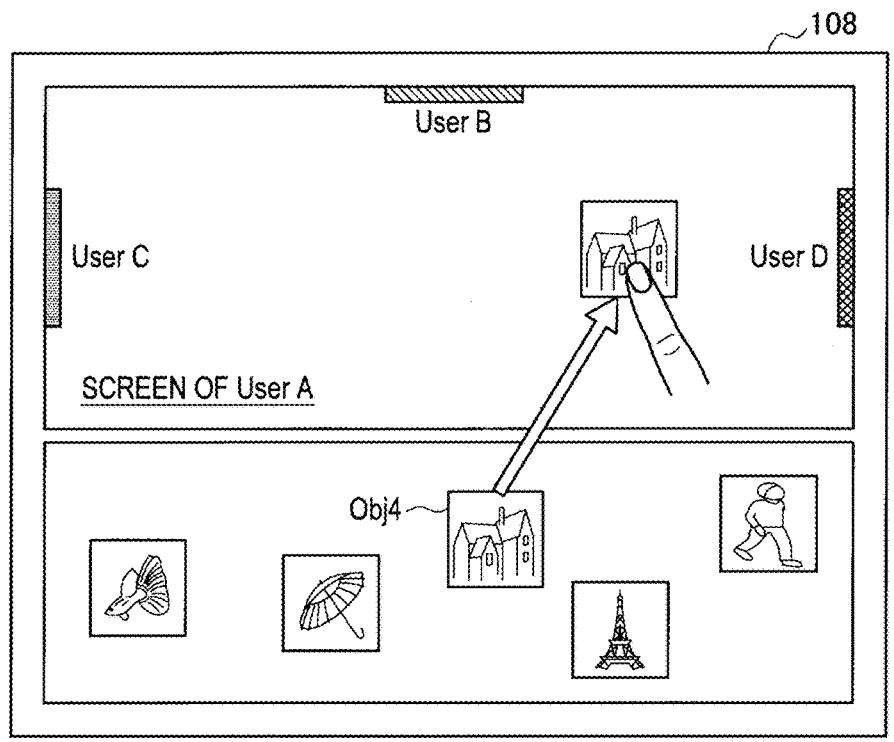
FIG. 6A is an explanatory diagram showing an example of the display structure of the shared application according to the embodiment.

In the example of FIG. 5, the user A (self-user) and the users B, C, D share the image sharing application, and accordingly, the users A, B, C, D share image data. Such sharing operation is performed as shown in FIG. 6A. The execution screen of the image sharing application shown in FIG. 6A is that of the terminal apparatus 100 of the user A. For example, when sharing image data related to a display object Obj4, the user A drags the display object Obj4 in the local region LA to the shared region SA. When this drag operation is completed, this image data is shared by the users A, B, C, and D.

Figure 6B:
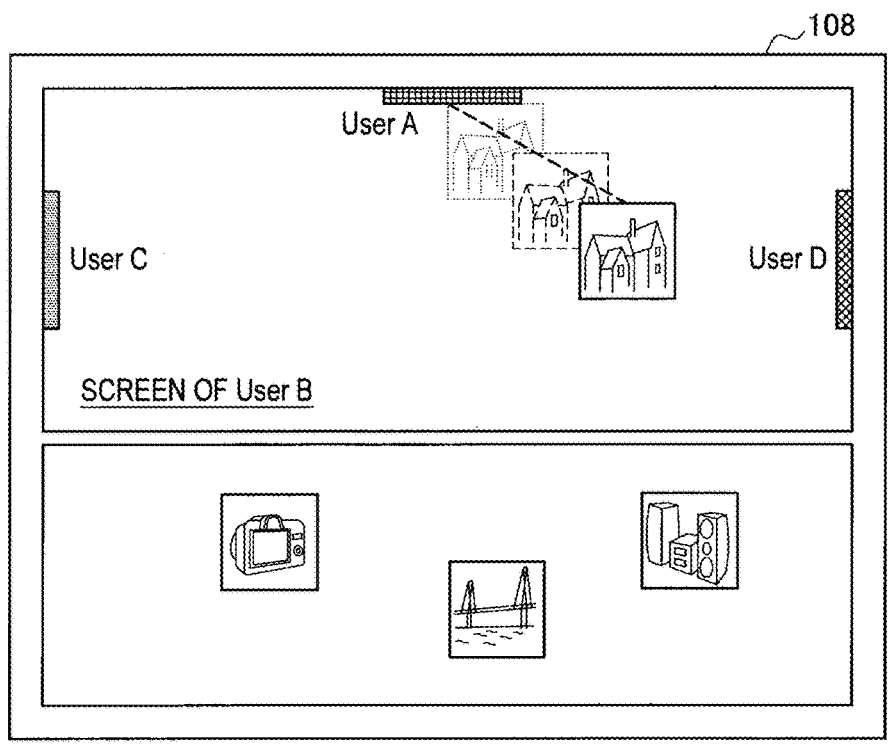
FIG. 6B is an explanatory diagram showing an example of the display structure of the shared application according to the embodiment.

In the sharing state, for example, as shown in FIG. 6B, the image data provided by the user A for sharing is displayed in the shared region SA of the image sharing application displayed on the screen of the terminal apparatus 100 operated by the user B. At this occasion, the image data is initially displayed at the position of the identification object of the user A displayed in the image sharing application. Then, the image data displayed at the position of the identification object is moved to the position of the image data moved by the user A. Further, the identification object of the user A and the display object representing the image data are connected by a line, which indicates the correspondence relationship therebetween.

Figure 7:
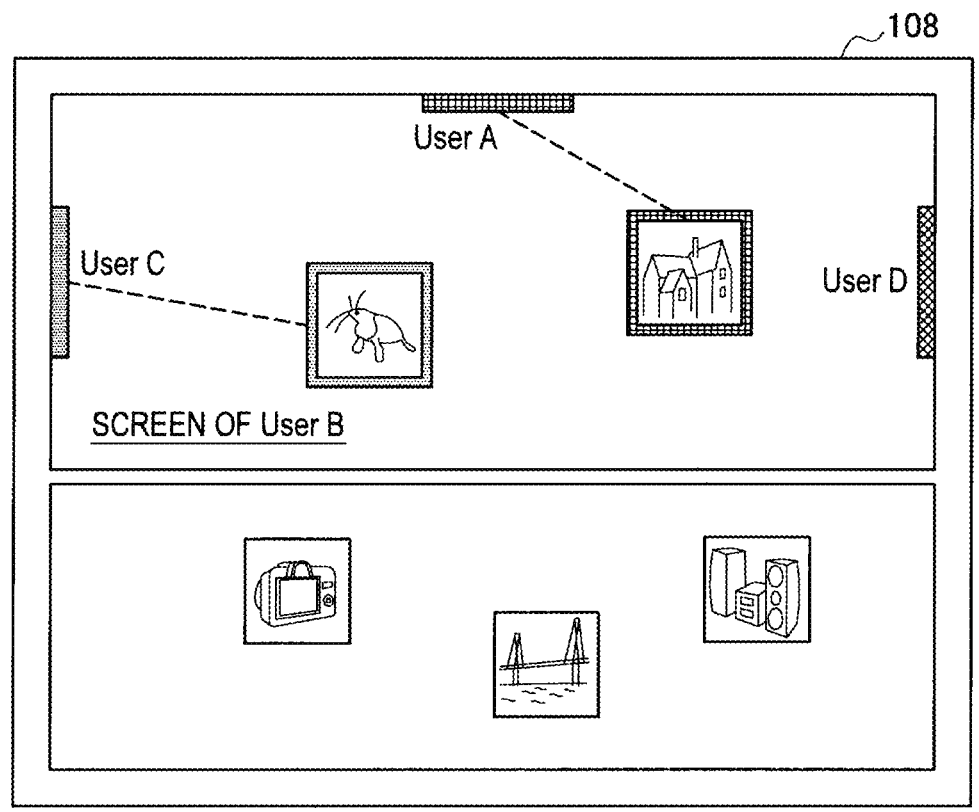
FIG. 7 is an explanatory diagram showing an example of the display structure of the shared application according to the embodiment.

With such display structure, the user B can easily recognize the correspondence relationship between the user A and the operation result. Further, the display object representing the image data is shown not only to the user B but also to the users C, D. Accordingly, the users C, D can also easily identify the operation performed by the user A. When multiple users provide image data for sharing, display objects of multiple image data are respectively displayed at positions of corresponding identification objects, and are respectively moved to appropriate positions, as shown in FIG. 7. In the example of FIG. 7, the image data provided by the users A, C for sharing are displayed at the positions of the identification objects of the users A, C, and are respectively moved to appropriate positions.

In the case of the image sharing application, a frame having the same color as the identification object may be displayed on the display object of each shared image data. With this configuration, it becomes possible to identify easily a user who holds image data in the local region LA. Alternatively, the color of the line may be the same as the color of the identification object.

The application example to image sharing application has been described above. As described above, the correspondence relationships between image data and identification objects displayed in the directions specific to the respective users are clearly shown. Therefore, another user can easily identify a user who holds shared image data in the local region LA. Further, by moving image data provided for sharing from the position of an identification object, it becomes possible to recognize easily timing at which sharing operation of image data is performed and a user who performed the sharing operation. As a result, users are less likely to feel awkward at an abruptly appearing display object of the image data shared by an unknown user.

In the explanation, the image sharing application has been described as an example. Alternatively, the above-described configuration may be applied to other shared applications, by associating display objects with contents such as music data and text data instead of image data. It should be noted that such variations are also included in the technical scope of the present embodiment.

[1-4: Regarding Private Sharing]

In the above explanation, the contents are shared by all the users who share and use the shared application. However, some pieces of content are desired to be shared by only a limited number of the users (private sharing users). In some case, the private sharing users are desired to be changed per content. In such case, it is extremely cumbersome to start the shared application all over again or to change the sharing setting of the private sharing users on every such occasion. To solve such issues, the inventors of the present invention have devised a method for setting/changing the private sharing users with easy operation and a user interface for facilitating the setting/changing operation. This method and the user interface will be hereinafter described.

(1-4-1: Method for Setting Private Sharing by Two Parties)

First, a method for setting private sharing by two parties (the users A, B) will be described with reference to FIG. 8, FIG. 9, FIG. 10A, and FIG. 10B. The private sharing referred to herein does not mean sharing of content (or display of operation results) by all the users who participate in a shared application, but means sharing of content (or display of operation results) by a limited number of users.

Figure 8:
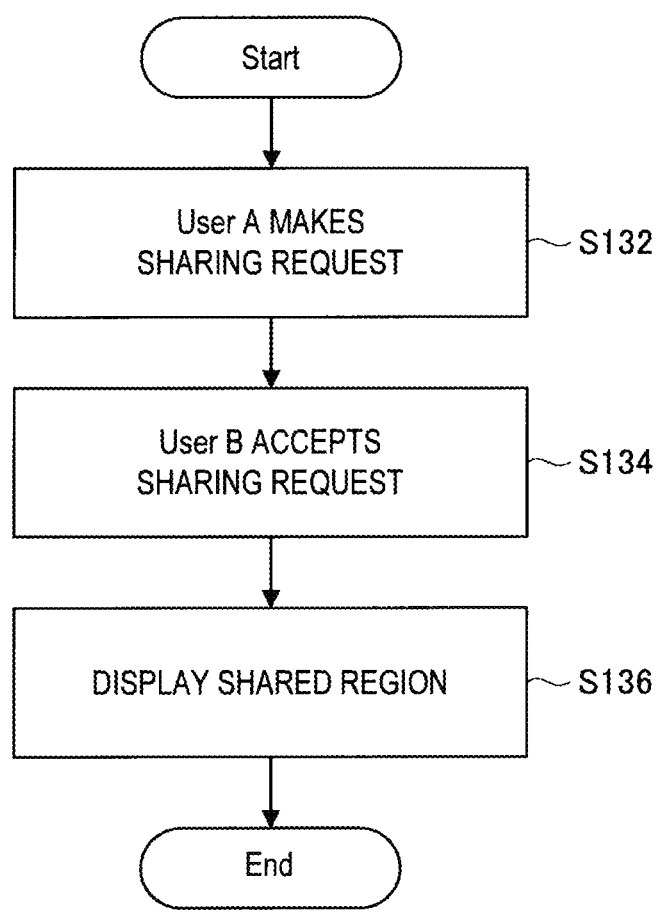
FIG. 8 is an explanatory diagram showing processing flow according to the display method of the embodiment.
Figure 9:
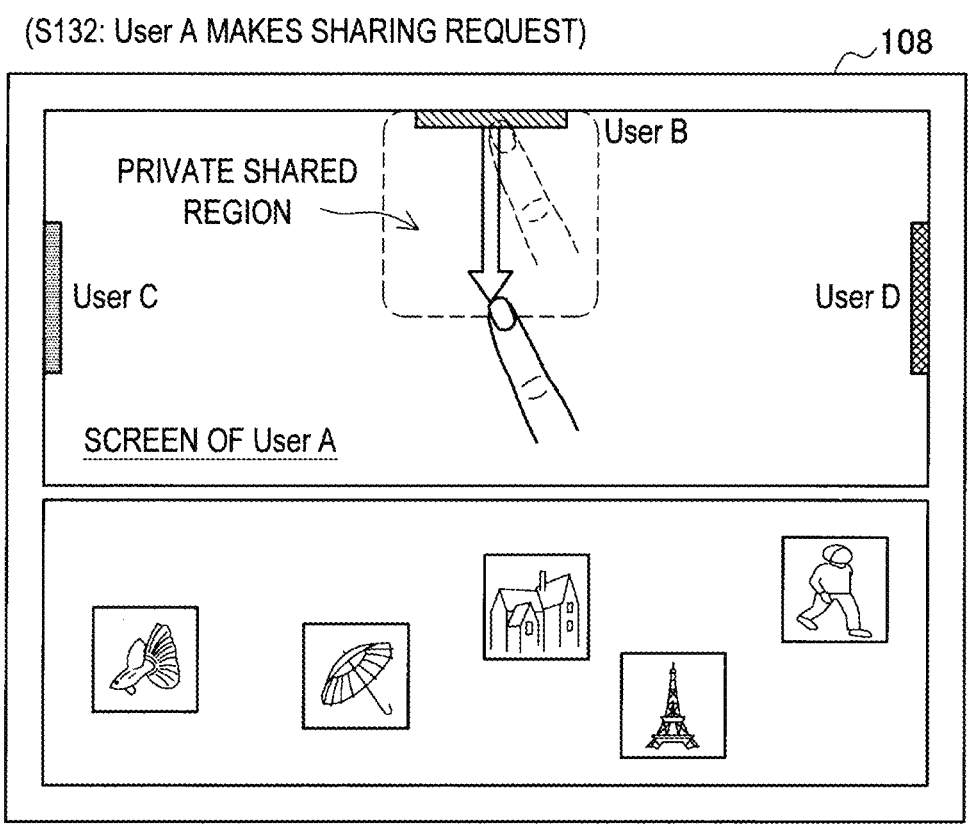
FIG. 9 is an explanatory diagram showing an example of the display structure of the shared application according to the embodiment.

The setting operation for the private sharing by the users A, B is realized, for example, by operation including three steps as shown in FIG. 8. First, the user A makes a sharing request (step S132). For example, as shown in FIG. 9, the sharing request in step S132 is made by dragging the identification object of a user, who is to be designated as a private sharing user, to the inside of the shared region SA. In the example of FIG. 9, a sharing request for private sharing is given from the user A to the user B. When this drag operation is performed, the private sharing request is notified from the terminal apparatus 100 of the user A to the terminal apparatus 100 of the user B.

Figure 10A:
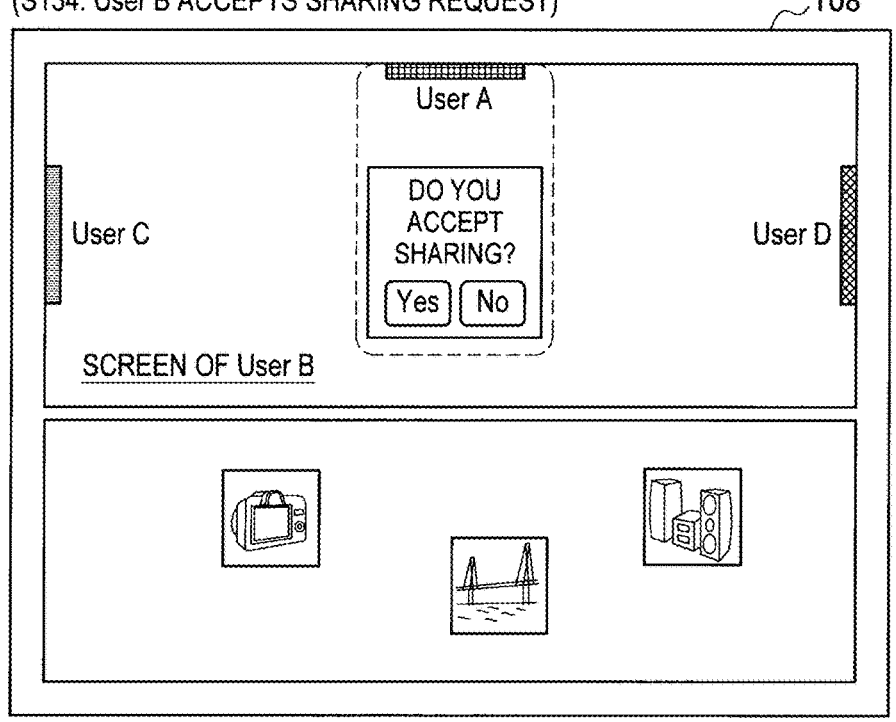
FIG. 10A is an explanatory diagram showing an example of the display structure of the shared application according to the embodiment.
Figure 10B:
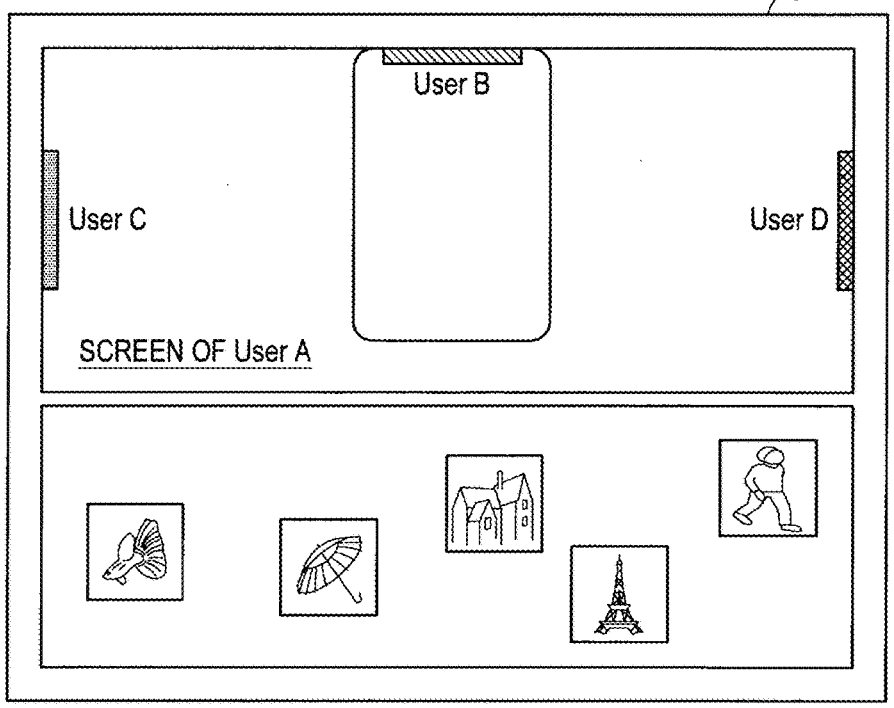
FIG. 10B is an explanatory diagram showing an example of the display structure of the shared application according to the embodiment.

When the private sharing request is notified, a display object for selecting whether to accept or reject the sharing request is displayed in the shared application displayed in the terminal apparatus 100 of the user B as shown in FIG. 10A. At this occasion, in the shared application displayed in the terminal apparatus 100 of the user B, the display object and the private shared region are displayed in association of the identification object of the user A. At this occasion, when the user B accepts the sharing request (step S134), the display of the private shared region is determined as shown in FIG. 10B (step S136).

When the above private shared region is set, the results of the operation performed in the private shared region are shown to only the private sharing users. For example, when the user A moves a display object of a piece of content to the private shared region in the example of FIG. 10B, the terminal apparatuses 100 of the users C, D do not display the display object of the piece of content. In such manner, by setting the private shared region, it becomes possible to share the content only between the private sharing users. Thus, by applying the configuration of the present embodiment, it becomes possible to restrict, with easy operation, users by whom data are shared.

(1-4-2: Method for Setting Private Sharing by Multiple Parties)

In the above-described method for setting a private shared region, the private sharing by two parties is set. Hereinafter, the method for setting private sharing by three or more users (for example, the users A, B, D) will be described with reference to FIG. 11 and FIG. 12A to FIG. 12D.

Figure 11:
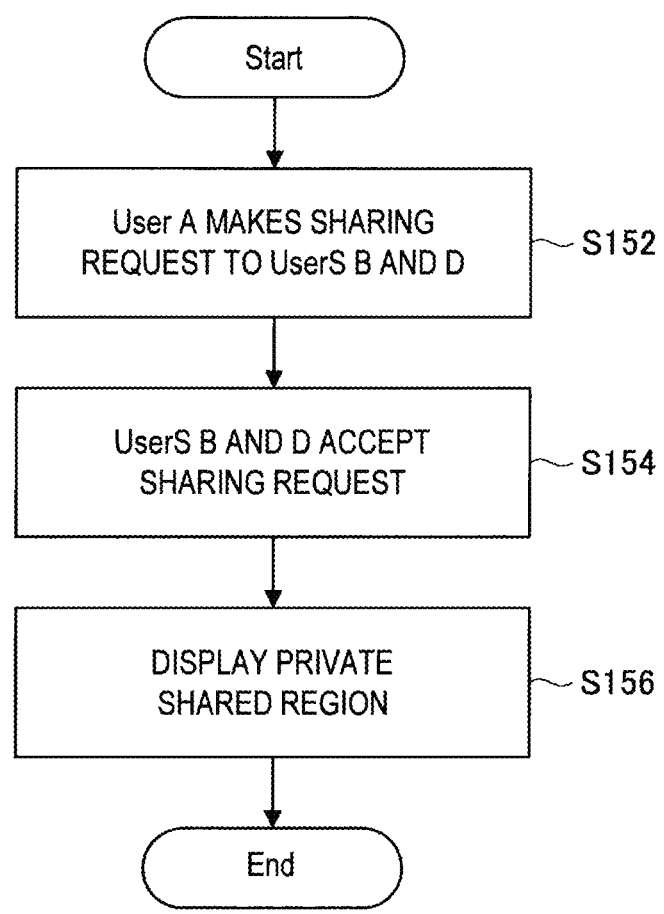
FIG. 11 is an explanatory diagram showing processing flow according to the display method of the embodiment.
Figure 12A:
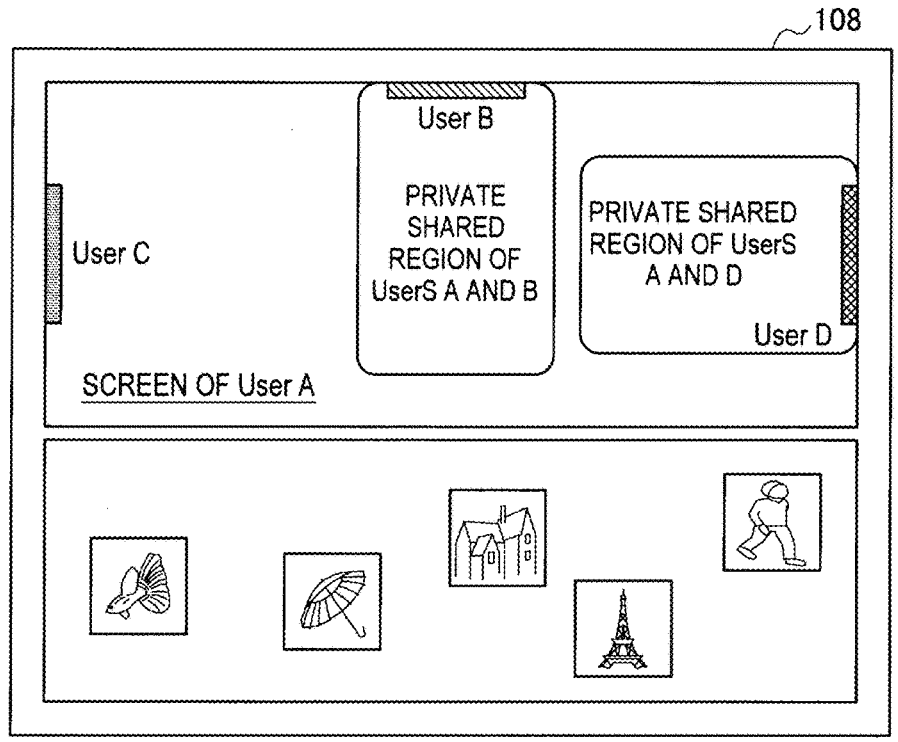
FIG. 12A is an explanatory diagram showing an example of the display structure of the shared application according to the embodiment.
Figure 12B:
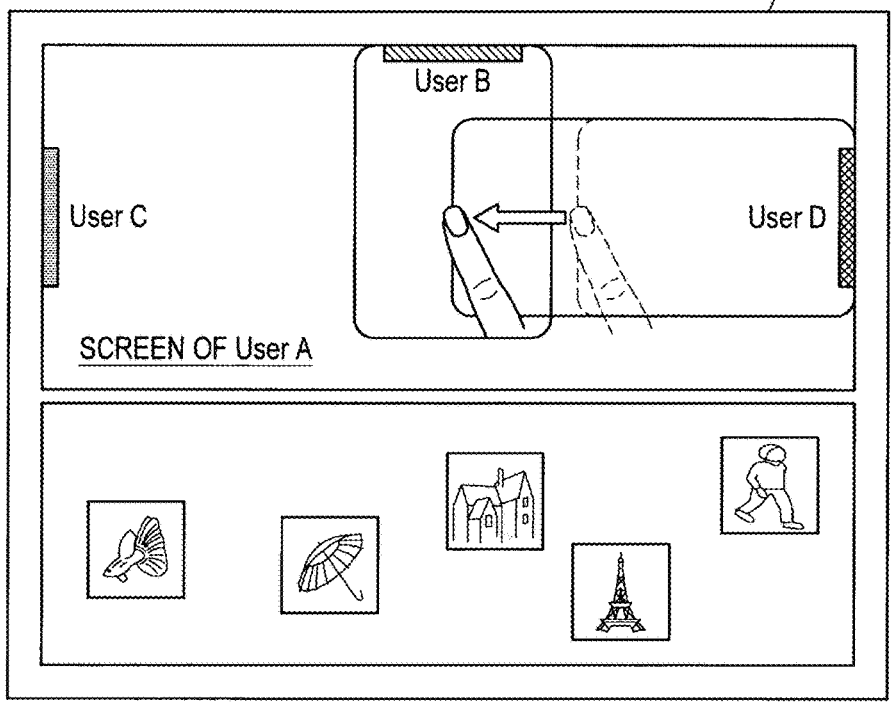
FIG. 12B is an explanatory diagram showing an example of the display structure of the shared application according to the embodiment.

The setting operation for the private sharing by the users A, B, D is realized, for example, by operation including three steps as shown in FIG. 11. However, as shown in FIG. 12A, the private shared region of the users A, B and the private shared region of the users A, D are assumed to be already set. First, the user A makes a sharing request to the users B, D (step S152). As shown in FIG. 12B, the sharing request of step S152 is made by, for example, enlarging or moving the private shared region of the users A, D such that the private shared region of the users A, D are overlaid on the private shared region of the users A, B.

Figure 12C:
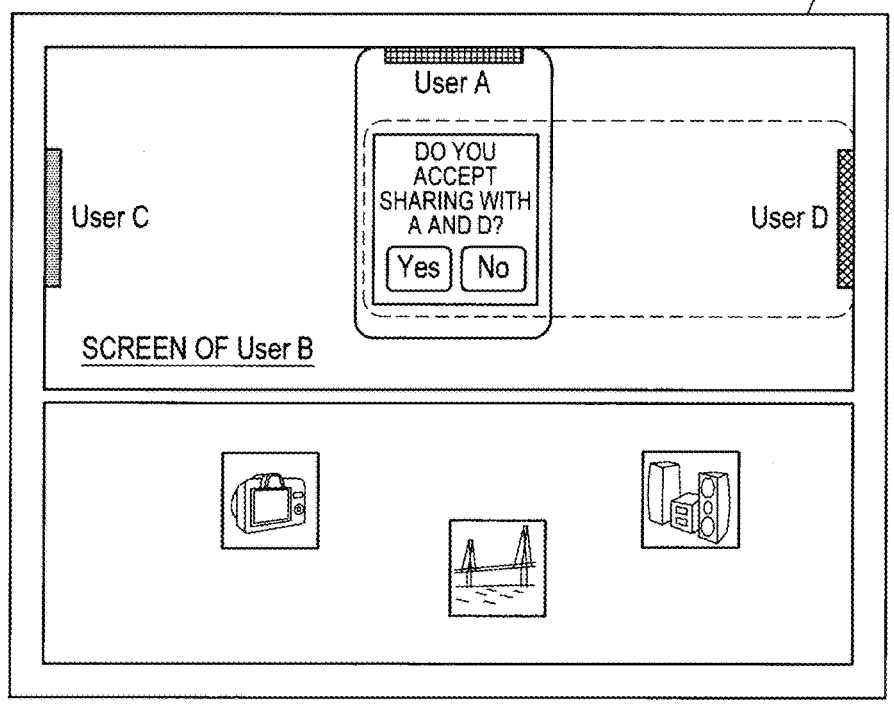
FIG. 12C is an explanatory diagram showing an example of the display structure of the shared application according to the embodiment.

When the private regions thus overlap with each other, the terminal apparatus 100 of the user A notifies the terminal apparatuses 100 of the users B, D of the private sharing request. Then, permission for the private sharing by the three parties, i.e., the users A, B, D, is requested as shown in FIG. 12C. At this occasion, in the shared application displayed on the terminal apparatus 100 of the user B, the display object for requesting the permission for the private sharing is displayed in association with the identification object related to the users A, D. The shared application displayed on the terminal apparatus 100 of the user D also displays the display object in the same manner.

Figure 12D:
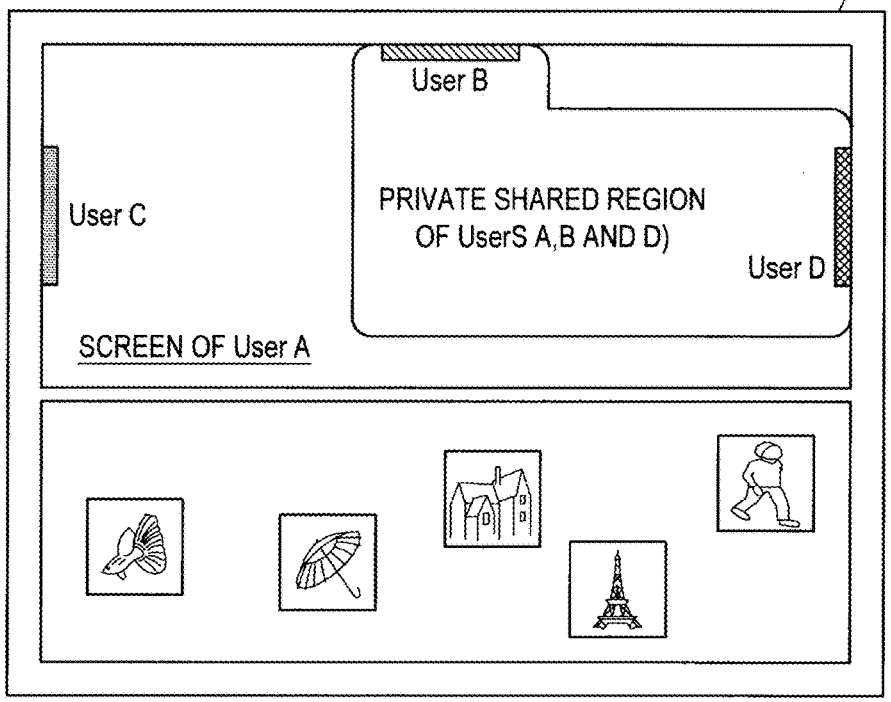
FIG. 12D is an explanatory diagram showing an example of the display structure of the shared application according to the embodiment.

When the permission for the private sharing by the users B, D is obtained at this occasion (step S154), the private shared region of the users A, B, D are set and displayed in the shared application as shown in FIG. 12D (step S156). In the example of FIG. 12D, all of the private shared region of the two parties, i.e., the users A, B, and the private shared region of the two parties, i.e., the users A, D, are set as the private shared region of the three parties, i.e., the users A, B, D. Alternatively, a portion of the private shared region of the two parties, i.e., the users A, B, and a portion of the private shared region of the two parties, i.e., the users A, D, may be preserved, and only the overlapping portion may be set as the private shared region of the three parties, i.e., the users A, B, D.

With the above configuration, it becomes possible to set the private shared region with intuitive operation. Besides, setting information of a private shared region is stored in the private user database 212 of the server apparatus 200.

(Release of Private Setting)

Figure 13:
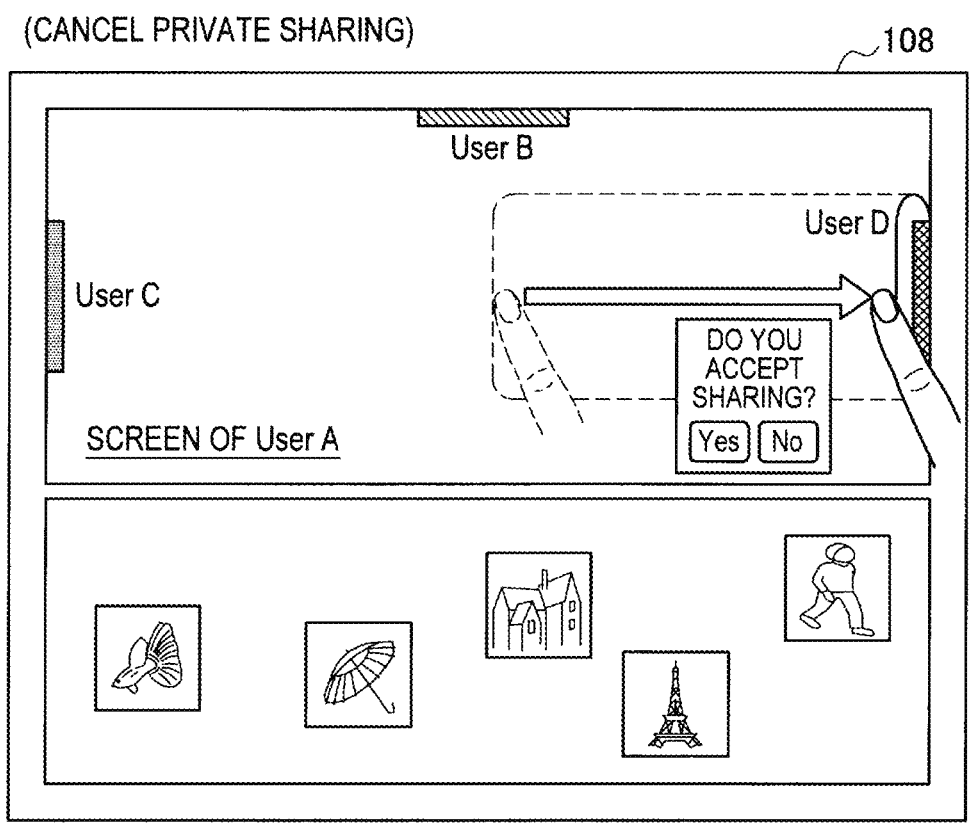
FIG. 13 is an explanatory diagram showing an example of the display structure of the shared application according to the embodiment.

The private sharing is released by reducing the private shared region toward the proximity the identification object as shown in FIG. 13. As shown in FIG. 13, when the private shared region is reduced to a predetermined size, a display object is shown to prompt the user to release the private sharing. When the release of the private sharing is accepted, the private sharing is released, and the private shared region disappears from the screen. In the example of FIG. 13, the private sharing by the users A, D is released by the user A. In this case, the terminal apparatus 100 of the user A notifies the terminal apparatus 100 of the user D that the private sharing is released. Then, a message indicating that the private sharing is released is displayed on the screen of the terminal apparatus 100 of the user D, and the private shared region disappears from the screen. Further, information indicating the private sharing by the users A, D, which is stored in the private user database 212 of the server apparatus 200, is erased from the private user database 212 of the server apparatus 200. Likewise, the private sharing by three or more parties is also released.

(Notification of Operation Performed by Another User in Reduced State)

Figure 14:
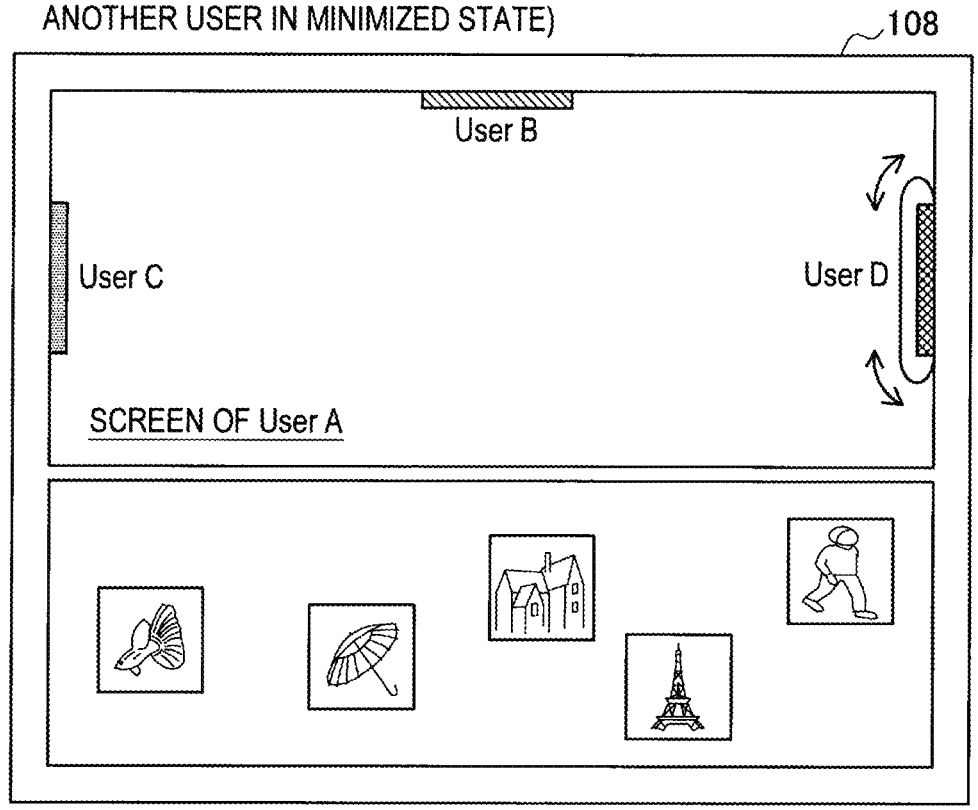
FIG. 14 is an explanatory diagram showing an example of the display structure of the shared application according to the embodiment.

As described above, the private shared region can be enlarged or reduced. However, when the size of the reduced private shared region is smaller than a display object of a piece of content, the private shared region may not show operation performed by another user. To solve this issue, as shown in FIG. 14, the private shared region or the identification object are configured to vibrate when another user performs operation in the small private shared region in a case where the private sharing region is small. With the above configuration, it becomes possible to recognize timing at which another user performs operation, regardless of the size of the private shared region. Instead of vibration, the following processing may be performed: periodical change of the color, periodical change of the shape, and automatic enlargement.

(1-4-3: Moving Content to Shared Region)

The method for setting a private shared region has been described above. Here, moving operation of content to a shared region, a two-party private shared region, and a multiple-party private shared region will be specifically described with reference to FIG. 15 to FIG. 18.

(Movement to Shared Region)

Figure 15:
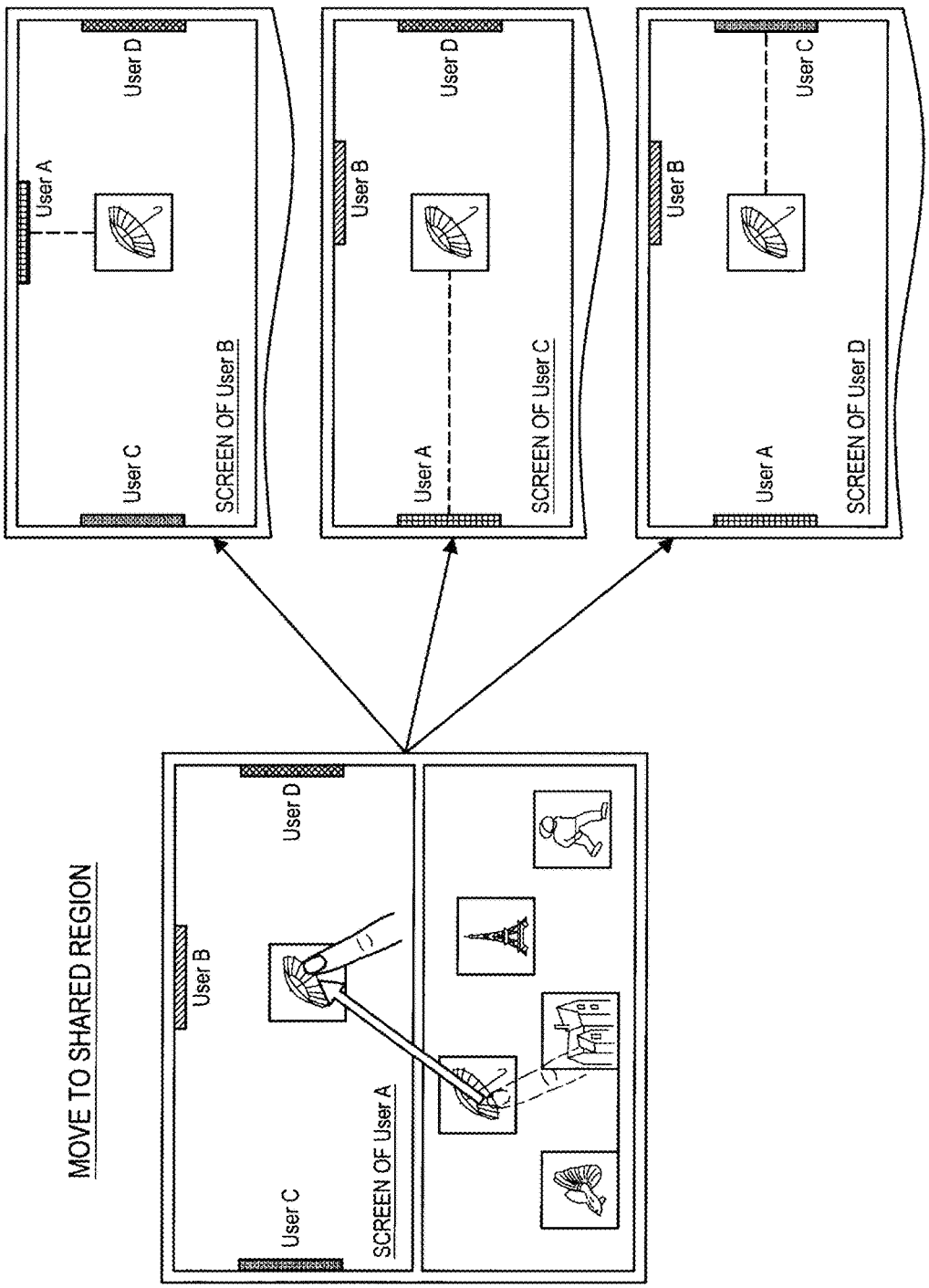
FIG. 15 is an explanatory diagram showing an example of the display structure of the shared application according to the embodiment.

First, FIG. 15 is referenced. FIG. 15 illustrates a content moving operation performed on a shared region SA in order to have a content shared by all the sharing users of the shared application. In the example shown in FIG. 15, the user A performs moving operation of a display object of a piece of content to the shared region SA. In this example, the users B, C, D participate in the shared use of the shared application. In this case, when the user A drags the display object of the pieces of content to the shared region SA, the display object of the piece of content is shown in the shared region SA for each of the users B, C, D. At this occasion, the display object in the shared region SA for each of the users B, C, D is displayed in such a manner that the display object is associated with the identification object of the user A by a line.

(Movement to Two-Party Private Shared Region)

Figure 16:
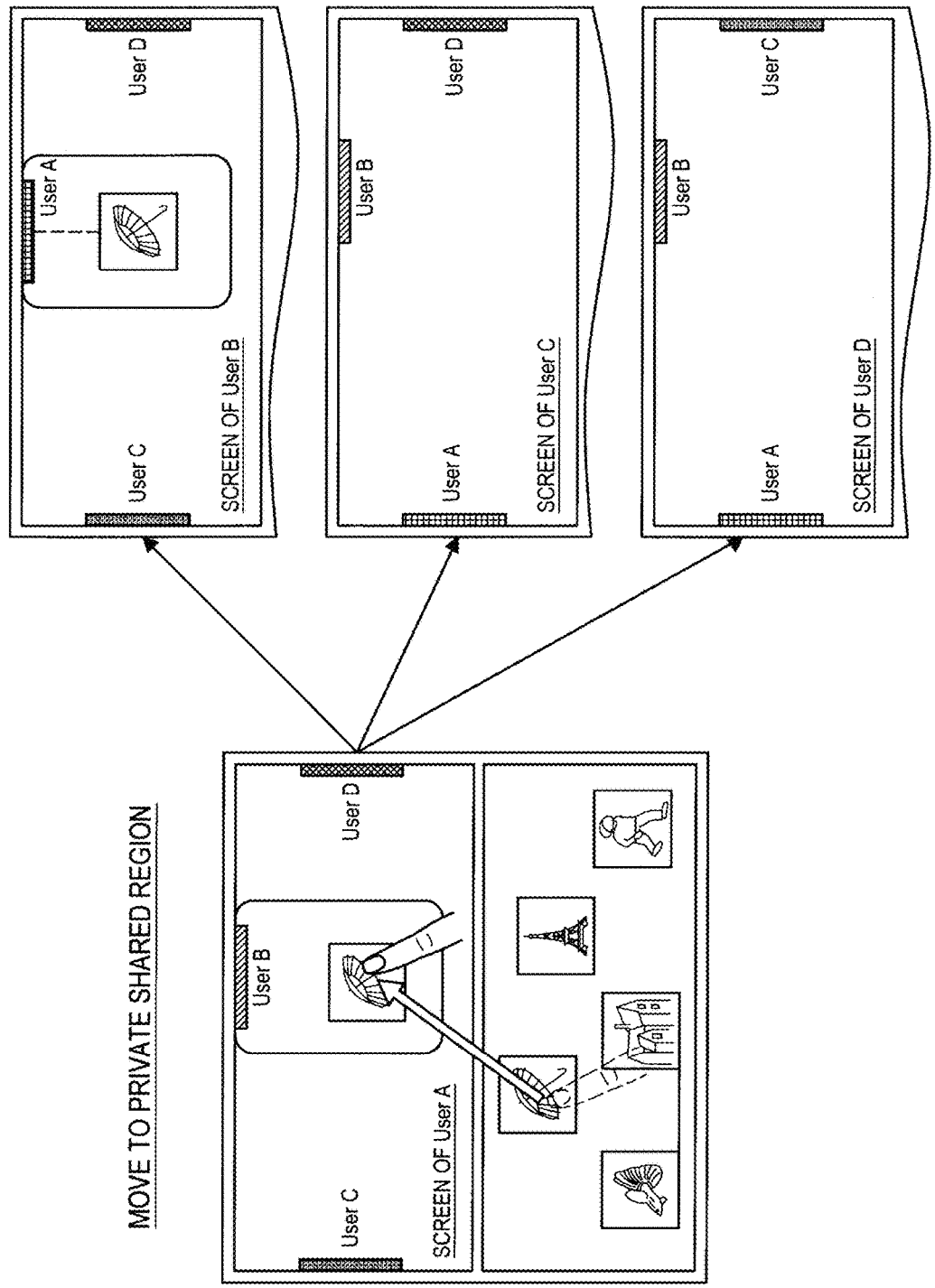
FIG. 16 is an explanatory diagram showing an example of the display structure of the shared application according to the embodiment.

Subsequently, FIG. 16 is referenced. FIG. 16 illustrates operation performed by the user A to move a display object of a piece of content to the private shared region of the users A, B. As shown in FIG. 16, when the display object of the piece of content is dragged to the private shared region of the users A, B, in the terminal apparatus 100 of the user B, the display object is displayed in the private shared region set in the shared application. However, in the terminal apparatuses 100 of the users C, D, the display object is not displayed in the shared region SA of the shared application. Thus, contents can be selectively disclosed by setting the private shared region.

(Movement to Multiple-Party Private Shared Region)

Figure 17:
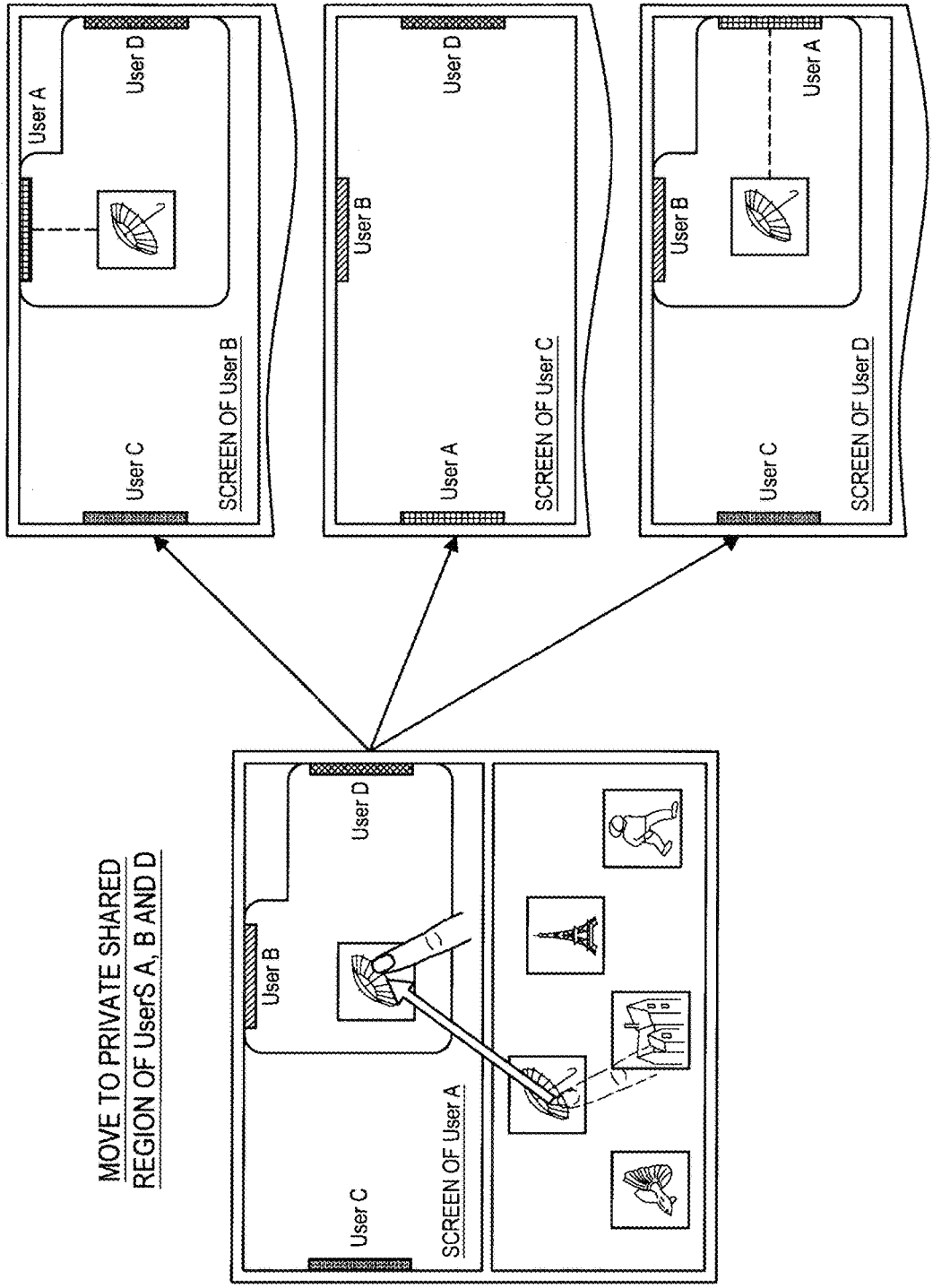
FIG. 17 is an explanatory diagram showing an example of the display structure of the shared application according to the embodiment.

Subsequently, FIG. 17 is referenced. FIG. 17 illustrates operation performed by the user A to move a display object of a piece of content to the private shared region of the users A, B, D. As shown in FIG. 17, when the display object of the piece of content is dragged to the private shared region of the users A, B, D, in the terminal apparatuses 100 of the users B, D, the display object is displayed in the private shared region set in the shared application. However, in the terminal apparatus 100 of the user C, the display object is not displayed in the shared region SA of the shared application. Thus, contents can be selectively disclosed by setting the private shared region.

(Movement Between Private Shared Regions)

Figure 18:
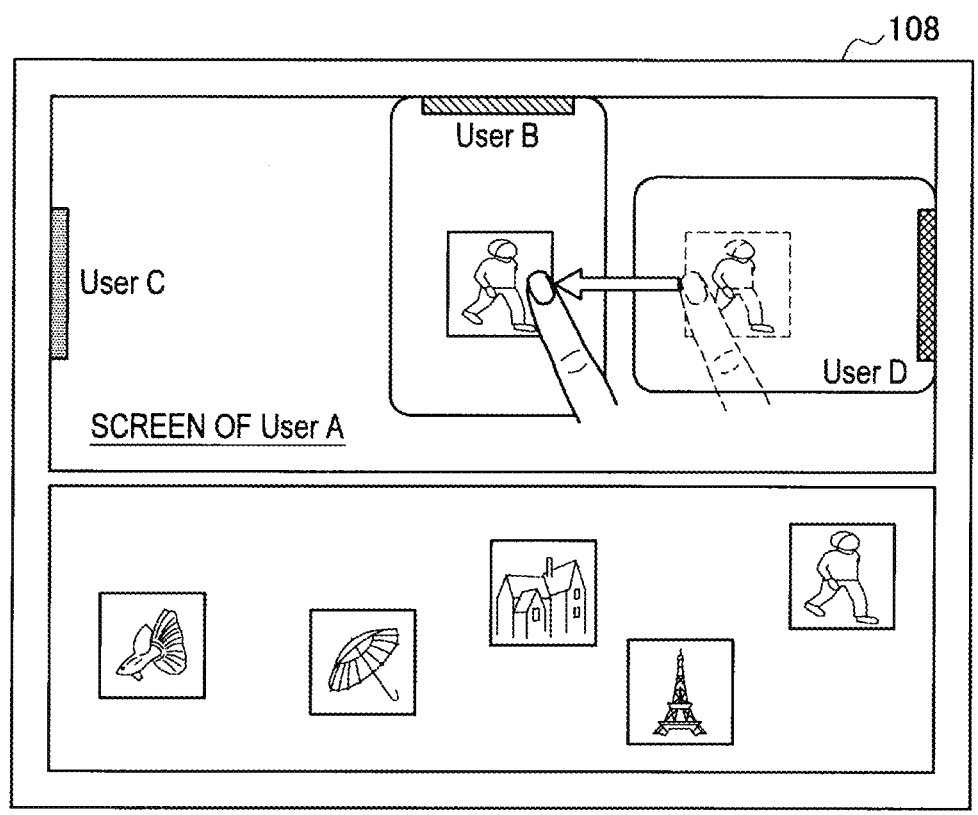
FIG. 18 is an explanatory diagram showing an example of the display structure of the shared application according to the embodiment.

Next, FIG. 18 is referenced. FIG. 18 illustrates operation performed by the user A to move a display object of a piece of content from the private shared region of the users A, D to the private shared region of the users A, B. While the display object is shown in the private shared region of the users A, D, in the terminal apparatus 100 of the user D, the display object is displayed in the private shared region of the shared application.

However, when the display object is moved to the private shared region of the users A, B, in the terminal apparatus 100 of the user D, the display object displayed in the private shared region of the shared application disappears. Alternatively, the display object may continue to be displayed, and the content may be copied. Such configuration may be realized according to a setting made by a user. On the other hand, in the terminal apparatus 100 of the user B, the display object is displayed in the private shared region of the shared application. As described above, the display object of the content can be moved between the private shared regions.

The private sharing has been described above. As described above, it becomes possible to set the private sharing with intuitive and easy operation. Further, the following operations can also be realized with intuitive and easy operation: sharing content between private sharing users, changing the scope of the private sharing, and releasing the private sharing.

[1-5: Operation of Identification Object]

Figure 19A:
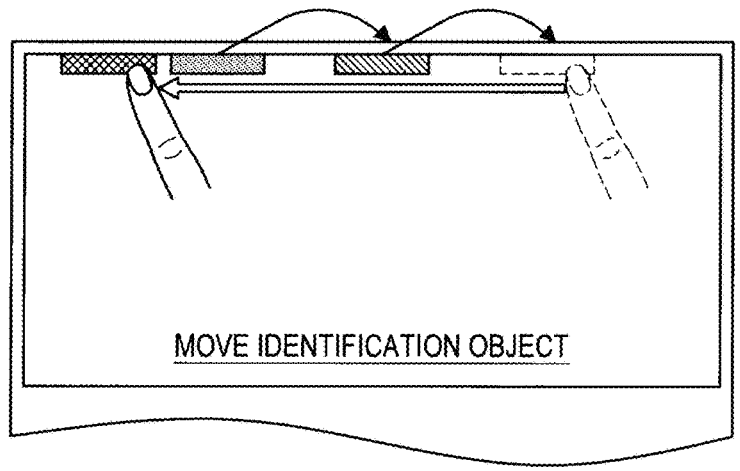
FIG. 19A is an explanatory diagram showing an example of the display structure of the shared application according to the embodiment.
Figure 19B:
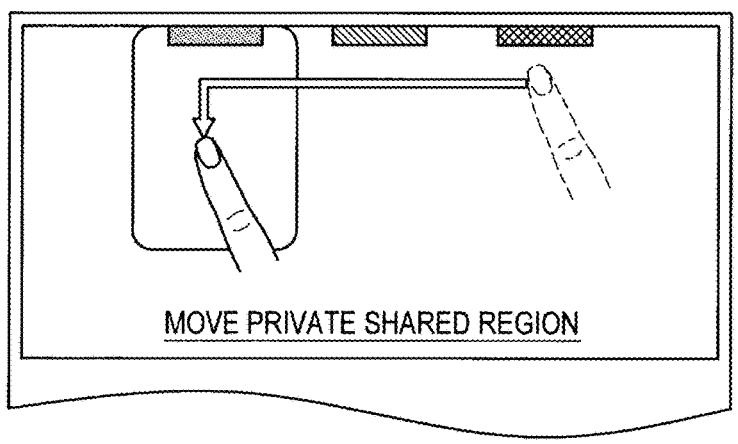
FIG. 19B is an explanatory diagram showing an example of the display structure of the shared application according to the embodiment.
Figure 19C:
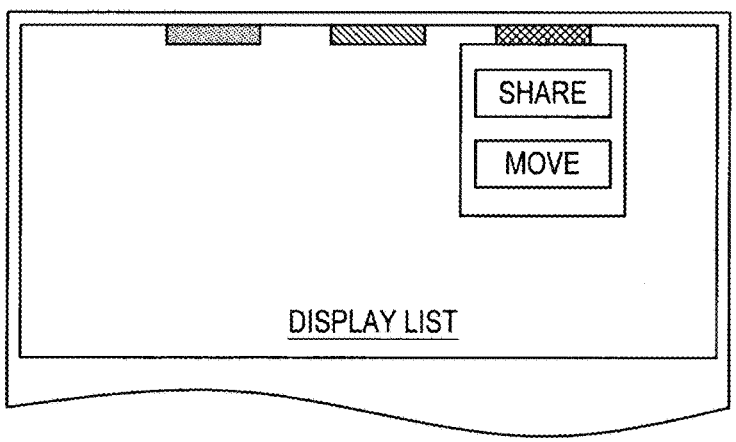
FIG. 19C is an explanatory diagram showing an example of the display structure of the shared application according to the embodiment.

Next, operation performed on an identification object will be described with reference to FIG. 19A to FIG. 19C. FIG. 19A illustrates an example of moving operation of an identification object. FIG. 19B illustrates an example of moving operation of a private shared region. FIG. 19C illustrates a list of operations performed with respect to an identification object.

As described above, an identification object is preferably displayed at a position specific to each user. However, a user may desire to change the order in which identification objects are sorted or change a display position. Accordingly, for a user who desires to change the order of arrangement or the display position, the order or the position may be changed by dragging an identification object as shown in FIG. 19A. Preferably, after the identification object is moved, the display positions are automatically adjusted with the order of arrangement being preserved as shown in FIG. 19A, so that the user can easily recognize the identification objects.

In some cases, the private sharing user is desired to be changed. In this case, two steps including a releasing step and a setting step are needed to release an already-set private sharing and reset a new private sharing. Accordingly, as shown in FIG. 19B, by moving the existing private shared region, i.e., by moving the existing private shared region to the position of the identification object of a user with whom the private sharing is to be newly made, the private sharing can be made with the new user. Besides, as shown in FIG. 19B, the change of the private sharing may be fixed by moving the private shared position downward at the position of the identification object with whom the private sharing is to be newly made. With the above-described configuration, the setting of the private sharing can be changed with one step operation.

In case where both of the moving operation and the private sharing operation can be activated as operation on an identification object, a list may be displayed as shown in FIG. 19C to allow a user to select which of the operations is to be performed, when the user touches the identification object. Since the list is thus displayed, the user can reliably perform a desired operation.

The operation performed on the identification object has been described above.

[1-6: Hardware Configuration Example]

Next, a hardware configuration example of a terminal apparatus 100, a server apparatus 200 will be described with reference to FIG. 20.

Figure 20:
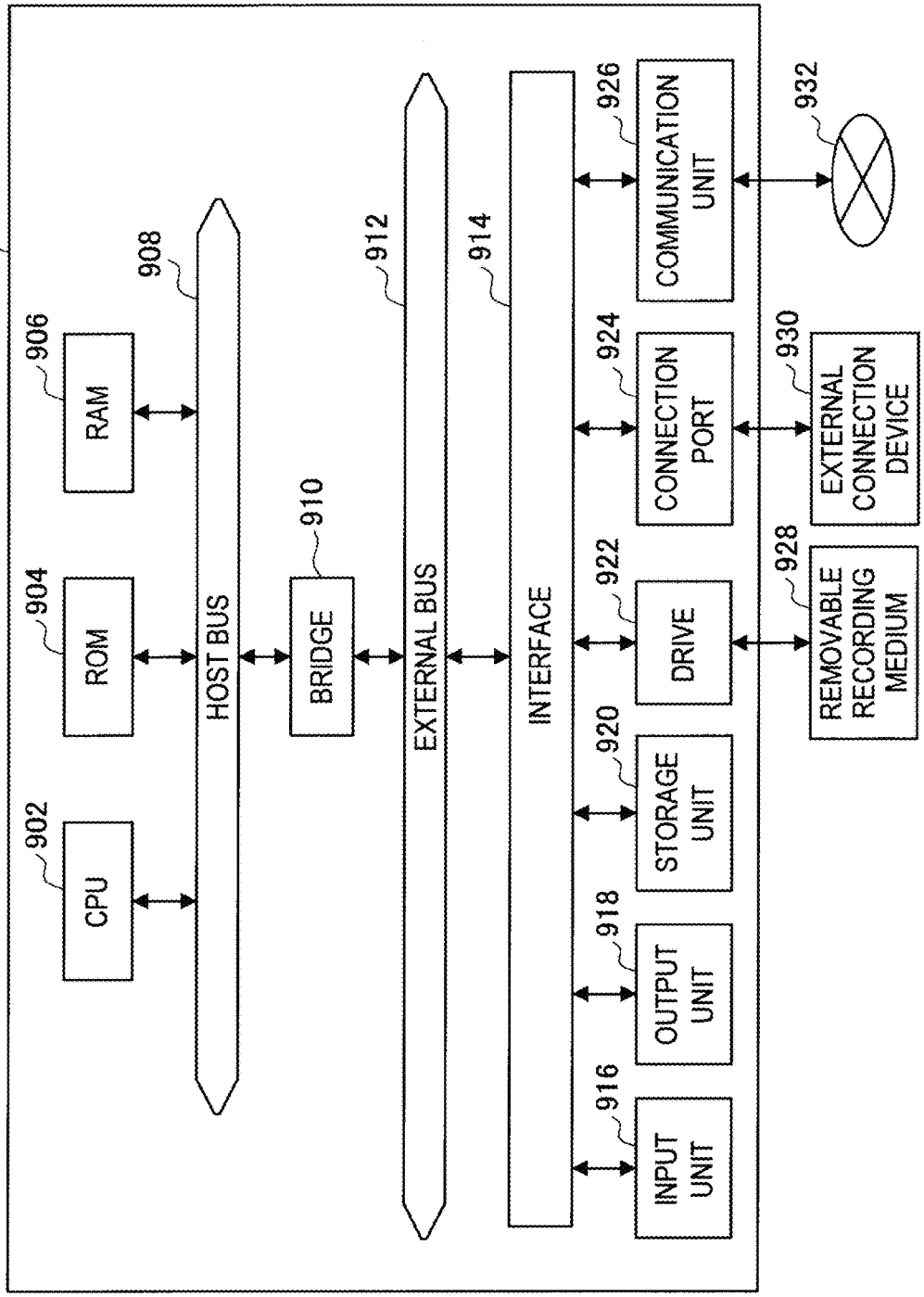
FIG. 20 is an explanatory diagram showing a hardware configuration example of the information processing apparatus that is capable of realizing the function of the terminal apparatus and the server apparatus according to the embodiment.

The functions of the respective structural elements included in the terminal apparatus 100 and in the server apparatus 200 described above, respectively can be realized, for example, by using the hardware configuration of an information processing apparatus shown in FIG. 20. That is, the function of each structural element is realized by controlling the hardware shown in FIG. 20 by using a computer program. Beside, the hardware in any form may be used, and it may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 20, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls an entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other via, for example, the host bus 908 capable of performing high-speed data transmission. For its part, the host bus 908 is connected via the bridge 910 to the external bus 912 whose data transmission rate is relatively low, for example. Furthermore, the input unit 916 is, for example, a mouse, a keyboard, a touch panel, a button, a switch, or a lever. Also, the input unit 916 may be a remote control that can transmit control signals on infrared rays or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. As a matter of course, the removal recording medium 928 may be, for example, an IC card on which a non-contact IC chip is mounted, or an electronic device. The IC is an abbreviation for Integrated Circuit.

The connection port 924 is a port such as an USB port, an IEEE1394 port, a SCSI, an RS-232C port, or a port to which an externally connected device 930 such as an optical audio terminal is connected. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a modem for each type of communication. The network 932 connected to the communication unit 926 includes a wired or wireless network, which is, for example, the Internet, a home-use LAN, infrared communication, visible light communication, broadcasting, or satellite communication. Moreover, the LAN is an abbreviation for Local Area Network. Also, the WUSB is an abbreviation for Wireless USB. Furthermore, the ADSL is an abbreviation for Asymmetric Digital Subscriber Line.

2: CONCLUSION

At the last, the technical contents according to the embodiment of the present invention will be briefly summarized. The technical contents described here can be applied to various kinds of information processing apparatuses such as a PC, a portable telephone, a portable game machine, a portable information terminal, a home information appliance, and a car navigation system.

The functional configuration of the above apparatus can be expressed as follows. The terminal apparatus has a shared application display unit for displaying an execution screen of a shared application on a screen. In the shared application, operations performed by multiple users via multiple terminal apparatuses connected to a network are reflected on the display as operation performed on one application. Thus, the terminal apparatus has a function of presenting the execution screen of the shared application to the users. The shared application referred to herein is a type of an application that reflects inputs given by other users with multiple terminal apparatuses connected via the network. For example, the spreadsheet application, the image sharing application, and other content sharing applications are examples of the shared application.

The shared application includes an identification object display function for displaying an identification object that associates each of the users with an operation result, displayed on the execution screen, reflecting the operations performed by each of the users, a shared region setting function for setting, when a first user selects an identification object related to a second user and specifies a region on the screen, the specified region as a shared region that is shared by the first and second users, and a display control function for controlling, when the first or second user performs operation in the shared region set by the shared region setting function, such that the displayed operations result reflecting the operation is not shown to users other than the first and second users. As described above, the shared application has the function for displaying the identification object and the function for setting the private shared region. Therefore, the user who uses the shared application can manage, with intuitive and easy operation, users whose operation results are displayed.

(Remarks)

The display processing unit 106 is an example of a shared application display unit. Further, the function which is realized by executing the shared application by the display processing unit 106 or the display information is an example of a identification object display function. Further, the function which is realized by executing the shared application by the display processing unit 106, the display information providing unit 208, the user administration unit 204, and the private user administration unit 210 is an example of a shared region setting function. Further, the function which is realized by executing the shared application by the display processing unit 106, the display information providing unit 208, the private user administration unit 210, and the communication unit 202 is an example of a display control function. Furthermore, the display processing unit 106 is an example of a shared application execution unit. The display information providing unit 208 is an example of an information providing unit.

It should be understood by those skilled in the art that various modifications, combinations, sub-combinations and alterations may occur depending on design requirements and other factors insofar as they are within the scope of the appended claims or the equivalents thereof.

In the above explanation about the embodiment, the information processing system 10 including the terminal apparatuses 100A, 100B and the server apparatus 200 has been described. However, the functions of the server apparatus 200 may be performed by any one or both of the terminal apparatuses 100A, 100B, and the information processing system 10 may be constituted by only the terminal apparatuses 100A, 100B. In this case, the terminal apparatuses 100A, 100B may be connected via ad hoc connection to a network cable or a wireless network. There may be three or more terminal apparatuses 100. Further, the information processing system 10 may include different types of terminal apparatuses 100. There may be a plurality of server apparatuses 200.

The present application contains subject matter related to that disclosed in Japanese Priority Patent Application JP 2009-222392 filed in the Japan Patent Office on Sep. 28, 2009, the entire content of which is hereby incorporated by reference.

What is claimed is:

1. An apparatus comprising:
at least one processor; and
at least one computer-readable recording medium having encoded thereon executable instructions that, when executed by the at least one processor, cause the at least one processor to carry out a method comprising:
displaying, in a first shared region of a screen that is shared by a plurality of users interacting with a shared application via a plurality of terminal apparatuses connected to a network, at least one first operation result of at least one first operation performed by one or more of the plurality of users interacting with the shared application;
displaying on the screen, for each user of the plurality of users, an identification object related to the user;
in response to a first user selecting an identification object related to a second user and providing input delimiting a first delimited region, that is a portion of the first shared region, to be set as a second shared region that is shared by the first user and the second user, setting the first delimited region as the second shared region that is shared by the first user and the second user; and
in response to the first user or the second user performing a second operation with respect to the second shared region, controlling display of a second operation result reflecting the second operation to the plurality of users such that the operation result is not shown to any user of the plurality of users other than the first user and the second user,
wherein setting the first delimited region as the second shared region in response to the first user selecting the identification object related to the second user and providing input delimiting the first delimited region of the first shared region comprises setting the first delimited region as the second shared region in response to the first user performing a drag-and-drop operation in the first shared region, wherein the drag-and-drop operation comprises:
detecting the first user clicking on the identification object related to the second user to select the identification object related to the second user;
while the identification object related to the second user is selected, detecting the first user dragging the identification object related to the second user to a position in the first shared region, wherein the position in the first shared region forms at least a portion of the boundary of the second shared region; and
releasing the identification object.

2. The apparatus according to claim 1, wherein the method further comprises:
in response to the first user selecting a second identification object related to a third user and providing input delimiting a second delimited region, that is a second portion of the first shared region, to be set as a third shared region that is shared by the first user and the third user, setting the second delimited region as the third shared region that is shared by the first and the third user; and
in response to the first user enlarging or moving the second shared region and/or the third shared region so that the second and the third shared regions overlap, setting an overlapping portion of the second and the third shared regions as a fourth shared region that is shared by the first user, the second user, and the third user.

3. The apparatus according to claim 2, wherein displaying a first operation result of the at least one operation result comprises displaying a line connecting the first operation result and the identification object for the user who performed the operation.

4. The apparatus according to claim 3, wherein:
the shared application is an application for sharing content, and
the method further comprises, in response to content being put in a shared state by the second user, displaying a display object representing the content in the shared state at a display position of the identification object related to the second user, and moving the display object from the display position to another location in the screen.

5. The apparatus according to claim 4, wherein the method further comprises:
when a size of the second shared region is smaller than a size of the display object representing the content in the shared state, moving or deforming the identification object related to the second user, or changing a color of the identification object.

6. The apparatus according to claim 1, wherein:
displaying the identification object for each user comprises displaying the identification object for a user at a predetermined position within the first shared region.

7. The apparatus according to claim 1, wherein the method further comprises:
executing the shared application and producing an execution result; and
displaying the execution result in the first shared region.

8. The apparatus of claim 1, wherein performing the drag-and-drop operation further comprises:
displaying on the screen, while detecting the first user dragging the identification object in the first shared region, a graphical element indicating an area of the first shared region that the first user is delimiting as the second shared region through the drag-and-drop operation.

9. The apparatus of claim 8, wherein displaying the graphical element comprises updating a size and/or shape of the graphical element in accordance with the detecting of the first user dragging the identification object.

10. The apparatus of claim 8, wherein displaying the graphical element comprises displaying a box indicating the area of the first shared region that the first user is delimiting as the second shared region.

11. The apparatus of claim 1, wherein the method further comprises:
transmitting, in response to setting the first delimited region as the second shared region, a sharing request to a terminal apparatus of the plurality of terminal apparatuses associated with the second user.

12. The apparatus of claim 11, wherein the method further comprises:
displaying on the screen, for the second user, a display object for selecting whether to accept or reject the sharing request.

13. An apparatus for controlling display of results of operations performed by a plurality of users interacting with a shared application, the results being displayed in a first shared region of a screen of the apparatus that is shared by the plurality of users, a plurality of identification objects also being displayed on the screen, each identification object of the plurality of identification objects being related to a user of the plurality of users, the apparatus comprising:
at least one processor; and
at least one computer-readable recording medium having encoded thereon executable instructions that, when executed by the at least one processor, cause the at least one processor to carry out a method comprising:
in response to a first user selecting an identification object related to a second user and providing input indicating boundaries of a region within the first shared region, setting the region of the first shared region within the indicated boundaries as a second shared region that is shared by the first and the second user; and
in response to detecting that the first user or the second user has performed a second operation with respect to the second shared region, controlling display of an operation result reflecting the second operation to the plurality of users such that the operation result is shown to the first user and the second user in the second shared region and is not shown to users other than the first user and the second user,
wherein setting the region of the first shared region as the second shared region in response to the first user selecting the identification object related to the second user and providing input indicating boundaries of the region within the first shared region comprises setting the region of the first shared region as the second shared region in response to the first user performing a drag-and-drop operation in the first shared region, wherein the drag-and-drop operation comprises:
detecting the first user clicking on the identification object related to the second user to select the identification object related to the second user;
while the identification object related to the second user is selected, detecting the first user dragging the identification object related to the second user to a position in the first shared region, wherein the position in the first shared region forms at least a portion of a boundary of the second shared region; and
releasing the identification object.

14. A display control method for displaying results of operations by a plurality of users interacting with a shared application, the results being displayed in a first shared region of a screen of at least a first apparatus operated by a first user of the plurality of users, a plurality of identification objects also being displayed within the first shared region of the screen, each identification object of the plurality of identification objects being related to a user of the plurality of users, the display control method comprising:
in response to the first user of the plurality of users selecting an identification object related to a second user of the plurality of users and delineating a region within the first shared region, setting the delineated region as a second shared region that is shared by the first user and the second user; and
in response to the first user or the second user performing a second operation in the second shared region, controlling display of an operation result reflecting the second operation to the plurality of users such that the operation result is shown to the first user in the second shared region and is not shown to any user of the plurality of users other than the first user and the second user,
wherein setting the delineated region as the second shared region in response to the first user selecting the identification object related to the second user and delineating the region within the first shared region comprises setting the first delineated region as the second shared region in response to the first user performing a drag-and-drop operation in the first shared region, wherein the drag-and-drop operation comprises:

detecting the first user clicking on the identification object related to the second user to select the identification object related to the second user;

while the identification object related to the second user is selected, detecting the first user dragging the identification object related to the second user to a position in the first shared region, wherein the position in the first shared region forms at least a portion of the boundary of the second shared region; and releasing the identification object.

15. At least one non-transitory computer-readable recording medium having encoded thereon executable instructions that, when executed by the at least one processor, cause the at least one processor to carry out a method comprising:

displaying on a screen in a first shared region, at least one result of at least one first operation performed by one or more of a plurality of users interacting with a shared application via a plurality of terminal apparatuses connected to a network;

displaying on the screen an identification object related to each user of the plurality of users;

in response to a first user selecting an identification object related to a second user and demarcating a region on the screen, setting the demarcated region as a second shared region that is shared by the first user and the second user; and in response to the first user or second user performing a second operation in the second shared region, controlling display of a second operation result reflecting the second operation to the plurality of users such that the operation result is not shown to any user other than the first user and the second user, wherein setting the demarcated region as the second shared region in response to the first user selecting the identification object related to the second user and providing input demarcating the demarcated region of the first shared region comprises setting the demarcated region as the second shared region in response to the first user performing a drag-and-drop operation in the first shared region, wherein the drag-and-drop operation comprises:

detecting the first user clicking on the identification object related to the second user to select the identification object related to the second user;

while the identification object related to the second user is selected, detecting the first user dragging the identification object related to the second user to a position in the first shared region, wherein the position in the first shared region demarcates at least a portion of the boundary of the second shared region; and releasing the identification object.

* * * * *